US012382855B2

(12) United States Patent
Heinold et al.

(10) Patent No.: US 12,382,855 B2
(45) Date of Patent: Aug. 12, 2025

(54) ACCELERATION COMPENSATION IN CONTROLLING A SEEDING MACHINE

(71) Applicant: Deere & Company, Moline, IL (US)

(72) Inventors: Martin Heinold, Bruchsal-Buechenau (DE); Jason D. Walter, Bettendorf, IA (US); Christian Waibel, Mannheim (DE); Ricardo Zamudio, II, Bloomington, IL (US); Grant J. Wonderlich, Milan, IL (US); Jacob W. Stohl, East Moline, IL (US); Michael C. Steele, Orion, IL (US)

(73) Assignee: DEERE & COMPANY, Moline, IL (US)

( * ) Notice: Subject to any disclaimer, the term of this patent is extended or adjusted under 35 U.S.C. 154(b) by 646 days.

(21) Appl. No.: 17/313,386

(22) Filed: May 6, 2021

(65) Prior Publication Data

US 2021/0289687 A1 Sep. 23, 2021

Related U.S. Application Data

(63) Continuation of application No. PCT/US2020/032035, filed on May 8, 2020.

(30) Foreign Application Priority Data

May 9, 2019 (DE) .......................... 102019206734.4

(51) Int. Cl.
*A01C 7/10* (2006.01)
*A01C 7/04* (2006.01)

(52) U.S. Cl.
CPC .............. *A01C 7/102* (2013.01); *A01C 7/046* (2013.01)

(58) Field of Classification Search
CPC .......... A01C 7/102; A01C 7/046; A01C 7/20; A01C 21/005
See application file for complete search history.

(56) References Cited

U.S. PATENT DOCUMENTS

| 9,883,626 | B2 | 2/2018 | Heim et al. |
| 2011/0015831 | A1 | 1/2011 | Farmer |
| 2013/0124055 | A1 | 5/2013 | Baurer et al. |
| 2014/0041563 | A1* | 2/2014 | Henry ................. A01B 79/005 111/139 |
| 2017/0094893 | A1 | 4/2017 | Rains et al. |

(Continued)

FOREIGN PATENT DOCUMENTS

| DE | 69914280 T2 | 12/2004 |
| DE | 102005010686 A1 | 10/2005 |
| DE | 102014106774 | 11/2015 |

(Continued)

OTHER PUBLICATIONS

International Search Report PCT/US2020/032035, dated Aug. 18, 2020, 11 pages.

(Continued)

*Primary Examiner* — Ig T An

(74) *Attorney, Agent, or Firm* — Christopher J. Volkmann; Kelly, Holt & Christenson P.L.L.C.

(57) ABSTRACT

A seeding machine (32,100) includes a seeding mechanism (34,130,150) driven by a seeding motor (194,196). A motor command signal is compensated for accelerations based on a wheel based speed of a towing vehicle (10).

19 Claims, 21 Drawing Sheets

(56) References Cited

U.S. PATENT DOCUMENTS

| | | | | |
|---|---|---|---|---|
| 2018/0208058 A1* | 7/2018 | Czapka | ................. | A01C 7/102 |
| 2020/0329630 A1* | 10/2020 | Baurer | ................. | A01C 7/107 |

FOREIGN PATENT DOCUMENTS

| | | | | |
|---|---|---|---|---|
| DE | 102016207510 | | 11/2017 | |
| EP | 0255630 A1 | | 2/1988 | |
| EP | 0726024 A1 | | 8/1996 | |
| EP | 0970595 A1 | | 1/2000 | |
| EP | 1329149 A1 | | 7/2003 | |
| EP | 1889532 A2 | | 2/2008 | |
| EP | 2047735 A1 | | 4/2009 | |
| EP | 2253187 | | 11/2010 | |
| EP | 2342963 B1 | | 11/2012 | |
| EP | 2636292 A1 | | 9/2013 | |
| EP | 2988586 A1 | | 3/2016 | |
| EP | 3000291 A1 | | 3/2016 | |
| EP | 3014993 A1 | | 5/2016 | |
| JP | 05-292811 | | 11/1993 | |
| JP | 2013-000007 | | 1/2013 | |
| JP | 2013000007 A | * | 1/2013 | ............ A01C 15/00 |
| JP | 2017-079696 | | 5/2017 | |

OTHER PUBLICATIONS

Extended European Search Report and Written Opinion issued in European Patent Application No. 20802531.2, dated May 17, 2023, in 8 pages.
PCT/US2020/032035 International Preliminary Report on Patentability, mailed Nov. 18, 2021, 7 pages.

* cited by examiner

ACCELERATION COMPENSATION IN CONTROLLING A SEEDING MACHINE

CROSS-REFERENCE TO RELATED APPLICATION

This Application is a continuation application filed under 35 U.S.C. 111 (a) and claims benefit of International Application No. PCT/US2020/032035, filed May 8, 2020, and 102019206734.4, filed May 9, 2019, the contents of which are hereby incorporated by reference in their entirety.

FIELD OF THE DESCRIPTION

The present description generally relates to planting equipment. More specifically, but not by limitation, the present description relates to a processing and control system for an agricultural seeding/planting machine that is configured to compensate command signals for accelerations.

BACKGROUND

There are a wide variety of different types of agricultural seeding or planting machines. They can include row crop planters, grain drills, air seeders or the like. These machines place seeds at a desired depth within a plurality of parallel seed trenches that are formed in the soil. Thus, these machines can carry one or more seed hoppers. The mechanisms that are used for moving the seed from the seed hopper to the ground often include a seed metering system and a seed delivery system.

The seed metering system receives the seeds in a bulk manner, and divides the seeds into smaller quantities (such as a single seed, or a small number of seeds-depending on the seed size and seed type) and delivers the metered seeds to the seed delivery system. In one example, the seed metering system uses a rotating mechanism (which is normally a disc or a concave or bowl-shaped mechanism) that has seed receiving apertures, that receive the seeds from a seed pool and move the seeds from the seed pool to the seed delivery system which delivers the seeds to the ground (or to a location below the surface of the ground, such as in a trench). The seeds can be biased into the seed apertures in the seed metering system using air pressure (such as a vacuum or a positive air pressure differential).

There are also different types of seed delivery systems that move the seed from the seed metering system to the ground. One seed delivery system is a gravity drop system that includes a seed tube that has an inlet position below the seed metering system. Metered seeds from the seed metering system are dropped into the seed tube and fall (via gravitational force) through the seed tube into the seed trench. Other types of seed delivery systems are assistive systems, in that they do not simply rely on gravity to move the seed from the metering mechanism into the ground. Instead, such systems actively capture the seeds from the seed meter and physically move the seeds from the meter to a lower opening, where they exit into the ground or trench.

In these types of planting machines, the metering system and the delivery system are both often driven by separate actuators. The actuators can be electric or other machines.

In some systems, an agricultural tractor moves several row units attached to one another on a tool carrier across a field and row units are controlled in such a way that the seed is spread out by metering elements at intervals as regular as possible.

For this purpose, an electronic map is used in modern precision seeding machines, which is created in advance or during the seeding process and in which the desired placement positions of the seeds are stored. The row units are then controlled based on a position determined with a position determination system, the map and the current speed of the seeding machine in such a way that the seed reaches a furrow created in the ground at the desired placement position. Reference is made to the state of the art e.g. according to DE 10 2005 010 686 A1, EP 2 047 735 A1, EP 2 636 292 A1 or EP 3 014 993 A1. The speed information is usually determined by a speed sensor interacting with the ground or by the position determination system and transmitted to the control of the row units. The speed information is required in order to be able to compensate for a temporal (and therefore spatial) offset between an activation of a row unit for dispensing a seed and the reaching of the actual placement location in the ground.

Analogous procedures are also used in seed drills in which the seeds are mechanically or pneumatically fed to the soil. The control of the respective part width sections or the entire working width metering elements for determining the seed quantities delivered takes place depending on the speed at which the machine is moved over the field (cf. e.g. EP 0 255 630 A1, EP 1 329 149 A1, EP 1 889 532 A2, EP 2 988 586 A1 and EP 3 000 291 A1).

When controlling the metering elements of the seeding machines, be it a precision seeding machine or a seed drill, the current driving speed of the seed drill or a vehicle pulling it is taken into account. This also applies to the control of the seeding machine in the event of any location-specific changes to seed rates based on maps in which the respective application rates are entered in a location-specific manner and are called up in a predictive manner depending on the respective (but assumed to be constant) speed (EP 0 726 024 A1, EP 3 014 993 A1).

However, the driving speed of the seeding machine is not necessarily constant, but can change during the seeding process, for example when starting at the beginning of the seeding process, in curves, when driving on uphill or downhill gradients or shortly before reaching and shortly after leaving the headland on which a change of direction (turning process) takes place. Due to time delays in the measurement of the speed and its transmission to a control unit of the seeding machine and because the metering elements, among other things. due to the (due to the air speed in the seed lines in the case of pneumatic seed drills and in the case of precision seed drills due to the falling time of the seed through a downpipe and/or the conveying speed of a conveying element between the metering element and the furrow) the runtime of the seed from the metering element to the furrow in the soil and a certain inertia of the drive of the metering element require a certain reaction time in order to adjust to a changed advance speed, errors occur in the previous seed drills in the event of any speed changes of the seed drill due to the delays mentioned, i.e. too much or too little seed per unit area is applied at the relevant points. Because of the delays mentioned, it is conceivable that immediately after starting from a standstill, there will remain spots on the field without seeds. Analogous problems arise when the seeding machine, together with the seed or separately from it, applies other granular materials (such as fertilizer, slug pellet, a second type of seed, etc.) to the field.

It was proposed in the case of a field sprayer with a control of the nozzles based on location-specific rates and dependent on the speed, to take into account manual inputs by a driver for speed adjustment in a predictive manner for calculating the application rates (EP 2 253 187 A1), or to learn a future, time-dependent speed profile of a seeding machine from these inputs collected over a longer period of time and to put the seeding machine into a standby mode based on the learned speed profile in a predictive manner, i.e. when reaching the headland (DE 10 2014 106 774 A1). While EP 2 253 187 A1 does not concern a seed drill and does not contribute to the solution of the said problem, the control based on learned, manually specified speed profiles according to DE 10 2014 106 774 A1 is relatively imprecise, because no prediction based on previous inputs can predict the future speed profile of the seeding machine sufficiently precisely in all cases and, since it only describes switching off in the headlands cannot contribute to solving the problem mentioned of the uneven seed quantities due to possible changes in speed.

The discussion above is merely provided for general background information and is not intended to be used as an aid in determining the scope of the claimed subject matter.

SUMMARY

A seeding machine includes a seeding mechanism driven by a seeding motor. A motor command signal is compensated for accelerations based on a wheel based speed of a towing vehicle.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
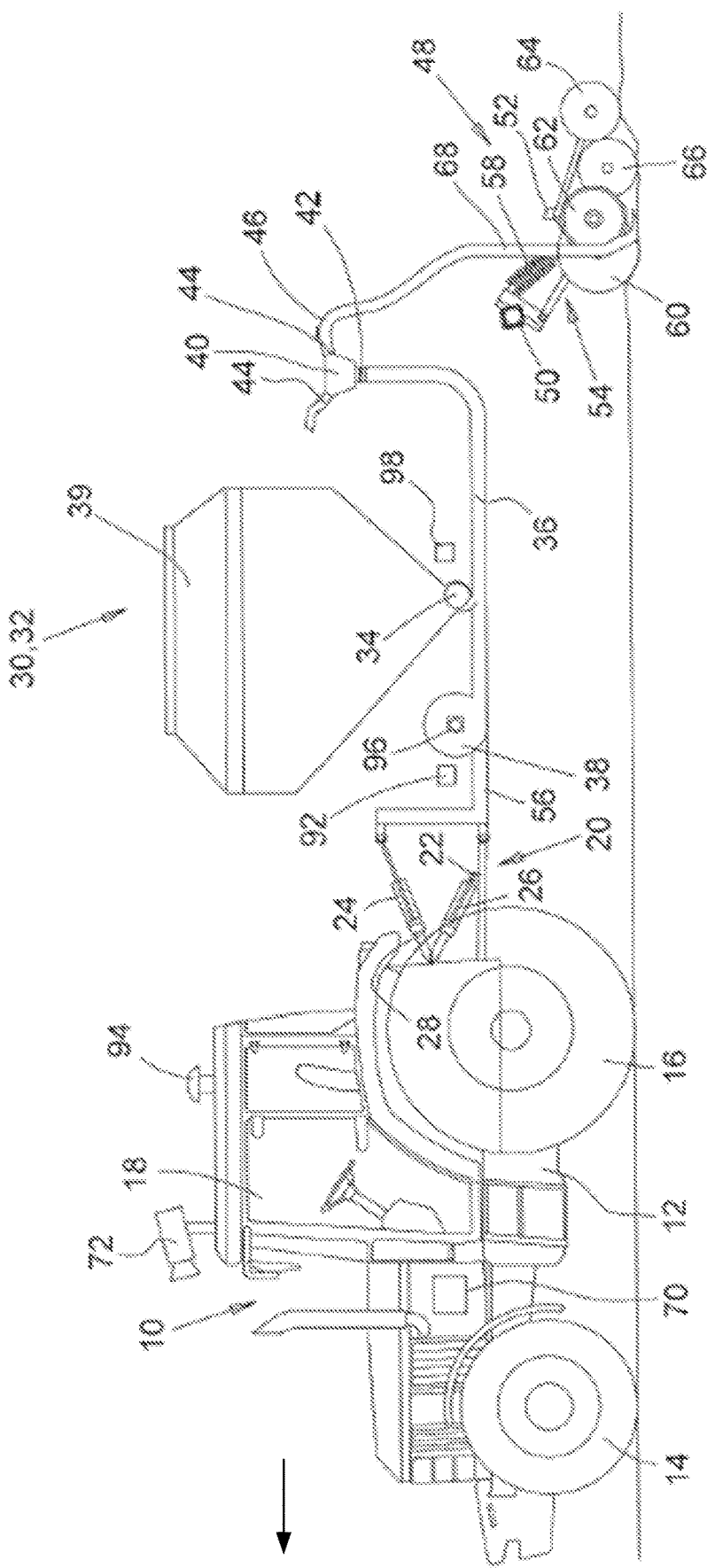
FIG. 1 is a schematic side view of a seeding machine in the form of a pneumatic drill machine pulled by a tractor.

The description improves a seeding machine such that a desired quantity of material rate can be applied to the field with a better exactness than in the state of the art.

A seeding machine is configured to be moved in a forward direction over a field and comprises a metering element for metering grain material like seeds, fertilizer and similar, in or onto the ground and a control device coupled in a signal-transferring manner to a drive of the metering element. The control device is configured to control the drive predictively based upon signals regarding an expected speed of the seeding machine In other words, the control device receives signals which contain information about how the speed of the seed drill will develop in the future. These signals are taken into account by the control device when activating the drive of the metering element in order to avoid the above-mentioned disadvantages of the previous control of the metering element based only on the measured speed of the seed drill. The desired application rates, which can e.g. be measured in numbers, volumes or masses of particles per unit area, or the desired positioning of the particles of the granular material in the ground with precision seed drills, are or is thus more precisely than previously observed.

The granular material expelled by the seeding machine can in particular be seed. The seeding machine is preferably also able to deliver other agricultural materials which are applied to the field together with the seed by the same metering elements or separately from the seed by separate metering elements, in particular specific to the respective position. Such materials can be, for example, fertilizers (e.g. micronutrients), granular agents for controlling unwanted organisms (such as slug pellets, fungicides, insecticides) or a second type of seed, which is used, for example, for greening. In the case of spreading by separate metering devices, the other materials can also be placed in a location-specific manner independent of the seed and at other locations than the seed.

The control device can be configured to control the drive based on a signal provided to the control device regarding the expected speed of the seeding machine such that the grain material is being discharged in predetermined quantities per area unit and/or at predetermined positions.

In particular, the control device can be configured to control the drive using the signals regarding the expected speed and considering the runtime of the grain material from the metering element to the ground in a predictive manner. The control of the drive is thus adjusted in a predictive manner considering the mentioned reaction times to possible future changes of the expected speed.

The control device on one hand by integrating the expected speed over time calculate a position and corresponding point of time to be reached by the seeding machine in the future (and in case of output amounts varying over the field also the amounts assigned to the position) more exactly than previously and on the other hand determine the speed of the seeding machine assigned to the position (and thus the amount of grain material to be expelled per time unit or path distance or at single grain positioning the respective point in time of output) more exactly than previously.

The control device can be connected to a position determination device and a storage memory in which a map of a field to be seeded and the corresponding speeds and/or data are stored in a position-specific manner based upon which the control device can calculate the speed of the seeding machine and/or the alterations thereof. Hence, the map can directly represent the respective speed of the seeding machine in particular along a pre-planned path or enable the control device to derive the speed from the position-specific stored data. Here fore, in the map the position of a headland and/or positive or negative slopes and/or curves to be driven can entered, based upon which the control device calculates the expected speed.

The control device can be configured to provide steering and speed signals based on the map and the signals of the position determination system to an automatic steering and speed control unit of a vehicle (for example, tractor) moving the seeding machine over the field. In another embodiment the control device can receive the speed signals from the automatic steering and speed control unit of a vehicle (for example, tractor) towing or supporting the seeding machine, which unit can serve for example for automating headland maneuvers.

The control device can be is connected to a sensor, the signals of which allowing a conclusion on the expected speed. Such a sensor can be a camera with an image processing system configured to recognize the future path of the seeding machine (for example, a headland, curves, obstacles, ground conditions causing slippage, positive and negative gradients of the ground) and speeds resulting therefrom. The sensor could also be connected to a driver-actuated speed input device (for example, gas pedal or drive lever) of a vehicle moving the seeding machine over the field. Thus, if the driver interacts with the speed control, the control device of the metering element also reacts predictively, while the speed adjustment of the vehicle and thus of the seeding machine takes place with a respective delay. The drive of the metering element is controlled, based upon the signal of the sensor and known relations between the signal of the sensor and the speed of the vehicle, in a manner ensuring that the rate of the expelled material always corresponds to the desired value despite a reduction or increase of the speed of the vehicle.

The seeding machine can be a drill machine with mechanic or pneumatic transport of the grain material or a single grain seeding machine. The described propagation method can also be used on other machines for outputting agricultural material, for example on a sprayer, the nozzles of which can be predictively controlled based on the expected speed, or at a fertilizer spreader.

In FIG. 1, an agricultural tractor 10 is shown on the left, which is built on a chassis 12 and is supported on the ground by steerable front wheels 14 and driven rear wheels 16. An operator's work station is located in a cabin 18. At the rear end of the chassis 12 there is a three-point hitch which is composed of two lower links 22 arranged next to one another and an upper link 28 mounted above them. The lower links 22 are height-adjustable by means of associated double-acting hydraulic cylinders 26 which pivot the lower links 22 about their articulation points on the chassis 12 about horizontal axes oriented approximately transversely to the forward direction. The upper link 28 is designed as a hydraulic cylinder 24 and is therefore variable in length.

A seed drill 32 in the form of a pneumatic seed drill 30 is attached to the three-point hitch, which alternatively could also be provided with a drawbar which is coupled to a trailer coupling of the agricultural tractor 10. The seed drill 30 can be supported in whole or in part on its assigned wheels, which are not shown for reasons of clarity.

The seed drill 30 comprises a seed hopper 39, on the bottom of which one or more metering element(s) 34 is or are arranged, which successively remove the seed from the seed hopper 32 and deliver it into a first line 36, which is charged by a fan 38 (driven mechanically or electrically or hydraulically by the agricultural tractor 10) with compressed air in order to convey the seeds into an inlet 42 of a distributor 40. The distributor 40 has outlets 44 distributed around its circumference, each of which is coupled to second lines 46 in order to guide the seed to row units 48, which guide it into a furrow formed in the ground and then close it.

Unlike shown, the seed drill 30 comprises a number of row units 48 arranged laterally next to one another, to each of which the seed is fed through an associated second line 46. The seed drill 30 can have a single distributor 40 or more distributors 40, and analogously also one or more conveying fans 38 and one or more metering members 34 in order to be able to individually adjust the seeding rates of individual sections.

The seed drill 30 could be equipped with further tanks which make it possible to dispense other agricultural materials which are applied to the field together with the seed by the same metering elements 34 or separately from the seed by separate metering elements, in particular specific to the area. Such materials can be, for example, fertilizer, granular agents for controlling unwanted organisms (such as slug pellets, fungicides, insecticides) or a second type of seed which is used, for example, for greening (so-called cover crop seeds). In the case of spreading by separate metering elements, the spreading of the other materials can be synchronized with the spreading of the seed and offset in the forward direction or laterally relative to the seed, so that the other material is positioned relative to the seed at a predetermined position, or the other material can be independent of the seed, specific to the area and placed at other locations than the seed. The dosing elements of the other material are also controlled in the manner described below.

The row units 48 each comprise a frame 52, which is connected via a parallelogram linkage 54 to a cross member 50, which in turn is connected to a frame 56 of the drill 30. A spring 58 biases the frame 52 downward. A furrow opener 60 for producing the furrow, a depth adjustment wheel 62 rolling on the ground for specifying the position of the frame 52 relative to the ground, a pressure wheel 66 for pressing the seed into the furrow and a closing wheel 64 for closing the furrow are attached in succession to the frame 52. A seed tube 68 is connected to the downstream, lower end of the second line 46 and guides the seed into the furrow.

The seed drill 30 comprises a control device 92 which, via a bus system, is connected to a position determination system 94 arranged on board the agricultural tractor 10, an actuator (or in the case of an electrically operated conveying fan 38 with an electrical control unit) 96 for specifying the conveying capacity of the conveying fan 38 and a drive 98 of the metering element 34 (or several drives 98 of several metering elements 34). The control 92 could also be wholly or partly on board the agricultural tractor 10 and connected to the actuator 96 and the drive 98 via a bus and a control unit on the drill machine side. In a simpler embodiment, the speed of the delivery fan 38 could also be constant.

The control device 92 is programmed to control the actuator 96 and the drive 98 of the metering member 34 in such a way that a desired distribution of the seed in the field is achieved. For this purpose, the control device 92 has a map of the field and associated application quantities of the seed stored in a memory, while the current position on the field is recorded by the position determination system 94.

The map also shows the paths of the agricultural tractor 10 across the field (including the turning operations in the headlands and, if necessary, curves to be traveled, which are predetermined by the field contours or obstacles) and the associated speeds of the agricultural tractor 10 in a location-specific manner. The control device 92 sends control signals to a steering and speed setting device 70 of the agricultural tractor 10, i.e. the latter is steered automatically based on the map and its speed of advance is also specified automatically, as described in the context of ISO 11783. Another procedure is also conceivable, in which an automatic steering and speed control device 70 of the agricultural tractor 10, which serves, for example, to automate turning operations and possibly to automatically steer the agricultural tractor 10 over the field, determines (expected) speeds of the control device 92 of the tractor 10 transmitted via the bus system. Here, the automatic steering and speed control device 70 of the agricultural tractor 10 can access a map of the field that has been stored in advance (e.g. on a farm computer) with a planned route with associated speeds, or can create this map with the route during the work process, e.g. by initially by passing the field in order to determine the headland and the resulting routes are defined on the basis of the headland or by further crossings. It would also be conceivable to enable the operator of the agricultural tractor 10 to input the speed and to extract only possible (for example relative or percentage) changes in the speed when turning or driving around curves, up or down inclines, avoiding obstacles predictively from a map or from data generated during the work process or saved in advance or generated by means of a suitable sensor (e.g. camera 72 with image processing system, which can recognize the future path of the seeding machine 32 such as a headland, curves, obstacles, ground conditions leading to slippage, up or down inclinations in the terrain and the resulting speeds).

As an alternative or in addition, a suitable sensor can interact with a speed setting device of the agricultural tractor 10 that can be operated by the driver (accelerator pedal or driving lever). On the basis of the position of the speed setting device, which influences the speed of the agricultural tractor 10 only with a delay, the speed of the seeding machine 32 can be recognized in advance. Specifically, this means that in the event of a deceleration introduced by the speed input device, the rate of delivery of the material by the dosing member 34 is reduced before the deceleration introduced has an effect on the seeding machine 32, so that the rate also roughly coincides with the actual reduction in the forward speed of the seeding machine 32 of the material entering the furrow in the soil is reduced.

The control device 92 thus has data available, by means of which it can control the actuator 96 and the drive 98 in such a way that the application rates specified in the map, which vary over the field or are constant in each case, or input by the operator via a suitable interface (for example a virtual terminal) are achieved. These application rates can be measured in any units, e.g. number of seed particles, their mass or their volume per unit area or distance.

As can be seen from FIG. 1, the seed has to travel a relatively long way from the metering element 34 to the furrow. Any changes in the settings of the drive 98 and the actuator 96 thus have a delayed effect on the application rates. In addition, the settings required to achieve the desired spreading rates depend on the speed v of the seed drill 32 in its direction of travel across the field, which is measured in the prior art by local sensors, which results in further delays in the event of a change in speed until the latter changes arrive in control device 92.

Figure 2:
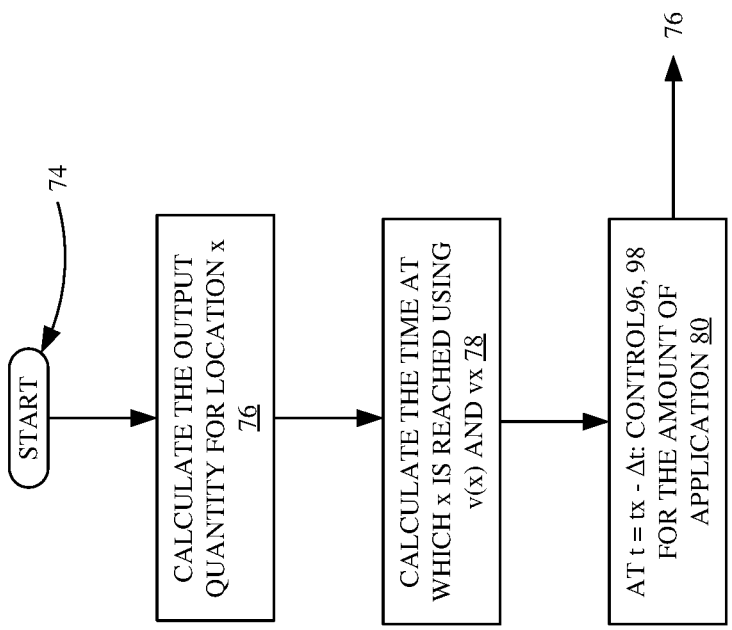
FIG. 2 is a flow diagram according to which the control device of the seeding machine works.

To avoid or reduce these disadvantages, the control device 92 operates according to the flow chart of FIG. 2. After starting in step 100, the application rate of the seed for a location x is calculated in step 102, which is sufficiently far ahead of the seed drill 32, so that the application rate is adjusted given the runtime of the seed through the seeding machine 32, the reaction times of the actuator 96 and possibly the drive 98 and the computing times of the control device 92 is still possible. The location x is therefore usually on the order of a few meters from a reference point of the seed drill 32, which is in particular the location of the lower end of the seed tube 68, be it in two-dimensional, horizontal coordinates or three-dimensional coordinates. The position of the position determination system 94 can be converted into the position of the reference point in a manner known per se (cf. EP 0 970 595 A1). The application rate calculated in step 102 relates, for example, to the number, the mass or the volume of particles of the seed per unit area and, as described above, can be specified in a constant or location-specific manner in the map in the memory of the control unit 92 or have been entered by the operator.

In the following step 104, the speeds of the seeder 32 stored in the map are used to calculate at what time tx the reference point of the seeder 32 will have reached the location x and what speed vx the seeder 32 will have there. The speed v (x), which is dependent on the location and is stored in the map, serves here on the one hand to determine the said point in time tx (It must be taken into account here that after leaving the metering device 34 the seed is in the second line 46 and can no longer be influenced in the seed tube 68 until the furrow is reached. Changes in the metering quantity must therefore take into account the non-changeable flight time of the seed between the metering element and the furrow), on the other hand, the control of the drive 98 also depends on the speed vx which the seed drill hat at location x, because at higher speeds v more seeds are to be delivered per unit of time than at low speeds V.

In step 106, the control device 92 commands the actuator 96 and the drive 98 at a point of time t which is a time offset $\Delta t$ before the time tx, to move with a speed which leads to the application rate which was calculated in step 102. Here, the current speed of the seed drill 32 is taken into account, as it was calculated in step 104. The time offset $\Delta t$ corresponds to the sum of the running time of the seed through the seeder 32 (between the dosing member 34 and the lower end of the seed tube 68) and the greater value of the reaction times of the drive 98 and the actuator 96 (or only the drive 98 if the actuator 96 is not adjusted).

In this way, possible changes in the speed v of the seed drill 32, which influence the application rates, are taken into account in a predictive manner. Step 106 follows step 102 again until the entire field has been processed. Steps 102 to 106 are carried out successively for all positions in the field covered by seed drill 32.

It should also be noted that switches (not shown, but see DE 10 2016 207 510 A1) can be inserted into the second lines 46 or at other points of the seeding machine 32, which can be moved into a closed position if necessary by associated actuators, in which the seed of a row unit 48 does not get into the ground but is returned to the seed hopper 39. For example, actuators 92 of the switches of row units 48 can be brought into the closed position by the control, which are located where tramlines are to be created. Also, when the seeding machine 32 approaches a headland at a non-orthogonal angle, individual row units 48 can be switched off successively by correspondingly actuating the switch actuators. The same procedure can be used for non-orthogonal entry into the field. Row units 48 can also be switched off if only part of the working width of the seed drill 30 is required. For this, reference is made to the prior art according to EP 2 342 963 B1 and the documents referenced there.

The embodiment of FIG. 1 relates to a seed drill 30. However, the described procedure for predictive control of the metering device can also be used on a precision seed drill, in which the individual row units are provided with separation mechanisms and delivery systems for seeds which are activated based on the respective position to ensure that the seed is deposited at predeterminable positions, for example to obtain a desired pattern of the plants in the field. With this control, the current speed of the drill must also be taken into account. If, for this purpose (for example in step 102 of FIG. 4 of EP 2 636 292 A1, the entire disclosure of which is incorporated by reference into the present documents), instead of using a locally sensed speed as in the prior art, one uses the predictively determined speed v (x) or vx in step 104, there is also a much greater accuracy in the positioning of the seed, since the latency times of the sensor and associated running and processing times of the signals in the event of possible speed changes are avoided.

Steps of FIG. 2
 74 Start
 76 calculate application material amount for position x
 78 calculate based on v (x) the point in time tx when x will be reached and vx
 80 at t=tx−Δt: control 96, 98 for corresponding application amount The present description also generally relates to seeding equipment (which includes planting equipment). One example agricultural seeding machine is described above. Another includes a seeding system in which a metering system meters seeds from a source and a delivery system delivers the seeds to a furrow or trench formed in the ground. The metering system operates to control the rate at which seeds are metered into the delivery system, to achieve a desired planting rate and/or seed spacing. Seeding systems can often be subjected to a variety of conditions that introduces irregularities in the metering and/or delivery of the seed to the furrow.

For example, as discussed above, there may be relatively quick accelerations and decelerations of the planting machine during operation. Some of them are mentioned above. In addition, there can be seed gaps in the field (areas of the field which are not planted) when the planting machine is starting from a stand still or going from a start to a stop. As discussed above, this is due to the delay between detecting planter motion, so that the seeding system can be actuated to place seeds in the ground, and the time when the seeds are actually placed in the ground.

By way of example, in order to plant a field, an operator may start a headland pass by backing up into to the corner of the field, and then going forward to plant. This often results in a planter-width gap before seed actually goes into the ground.

The present discussion thus proceeds with respect to a system that controls the metering system, and the delivery system, to begin delivering seed, even when the planting machine is traveling at a ground speed that is normally not fast enough to have the metering system and delivery system operating (e.g., during the initial phase of startup). The present discussion also proceeds with respect to a system that senses accelerations and decelerations, during normal operation, and compensates the metering system command, that commands metering speed, and the delivery system command, that commands delivery system speed, to accommodate for the detected acceleration or deceleration.

Figure 3:
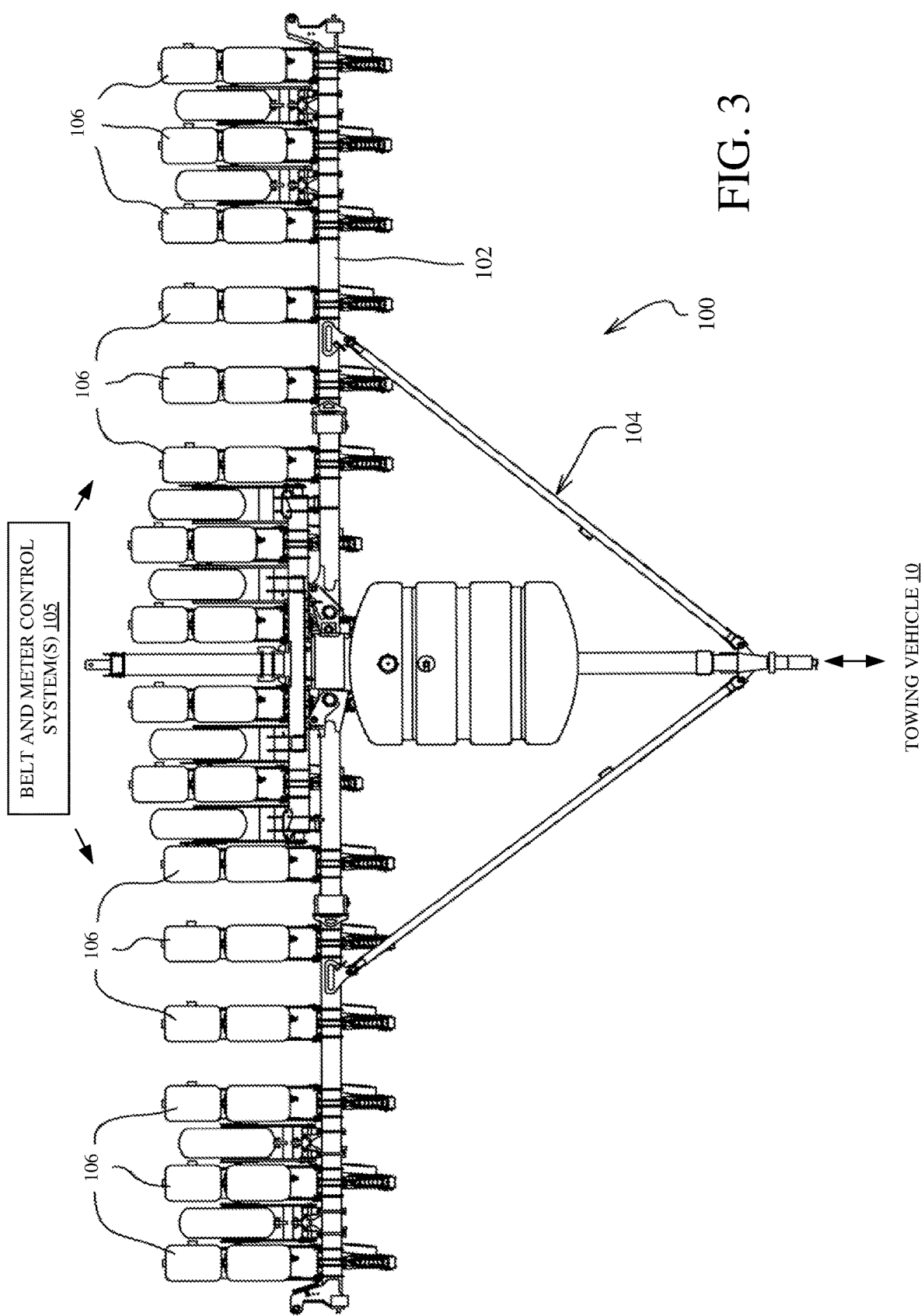
FIG. 3 shows one example of a top view of an agricultural machine.

FIG. 3 is a top view of one example of an agricultural machine 100. Agricultural machine 100 illustratively includes a toolbar 102 that is part of a frame 104. FIG. 3 also shows that a plurality of row units 106 are mounted to the toolbar. Agricultural machine 100 can be towed behind another machine, such as a tractor 10. FIG. 3 also shows a belt and meter control system 105 (described in greater detail below) that controls the metering and delivery systems on the row units. As is described elsewhere, system 105 compensates the speed commands to the metering and delivery systems for the delays during startup and during acceleration and deceleration. Only one system 105 is shown in FIG. 3, but it will be noted that there can be a system 105 on each row unit 106, a system 105 to serve multiple row units 106, or a different number of systems 105. Also, in another example, the system 105 can be in controller 92 in the above FIGS., it can be on towing vehicle 10 or distributed among multiple locations. It is illustratively in communication with tractor 10 to receive a wheel based speed (WBS) signal from tractor 10.

Figure 4:
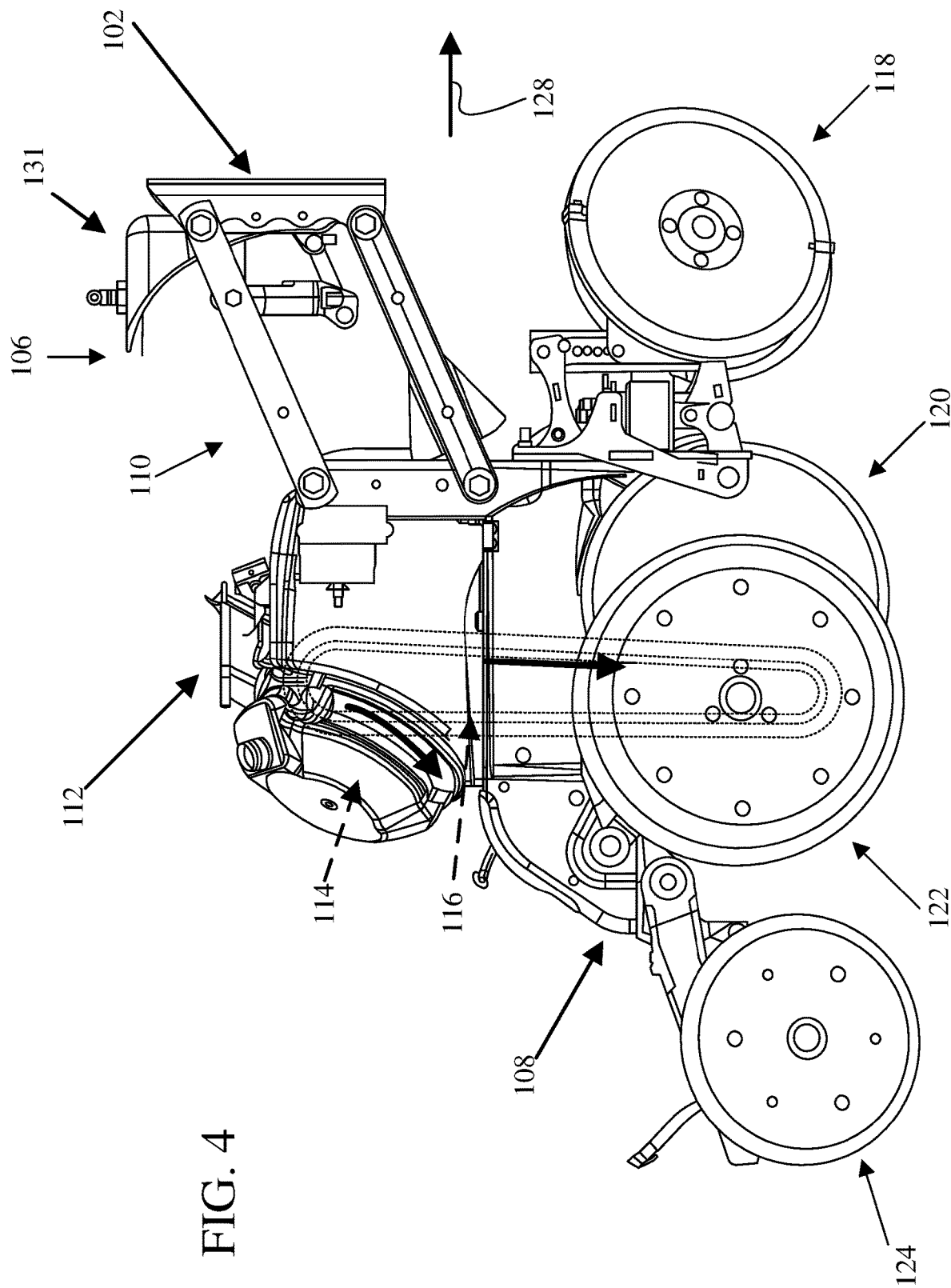
FIG. 4 shows one example of a side view of a row unit of the agricultural machine shown in FIG. 1.

FIG. 4 is a side view showing one example of a row unit 106 in more detail. FIG. 2 shows that each row unit 106 illustratively has a frame 108. Frame 108 is illustratively connected to toolbar 102 by a linkage shown generally at 110. Linkage 110 is illustratively mounted to toolbar 102 so that it can move upwardly and downwardly (relative to toolbar 102).

Row unit 106 also illustratively has a seed hopper 112 that stores seed. The seed is provided from hopper 112 to a seed metering system 114 that meters the seed and provides the metered seed to a seed delivery system 116 that delivers the seed from the seed metering system 114 to the furrow or trench generated by the row unit. In one example, seed metering system 114 uses a rotatable member, such as a disc or concave-shaped rotating member, and an air pressure differential to retain seed on the disc and move it from a seed pool of seeds (provided from hopper 112) to the seed delivery system 116. Other types of meters can be used as well.

Row unit 106 can also include a row cleaner 118, a furrow opener 120, a set of gauge wheels 122, and a set of closing wheels 124. It can also include an additional hopper that can be used to provide additional material, such as a fertilizer or another chemical.

In operation, as row unit 106 moves in the direction generally indicated by arrow 128, row cleaner 118 generally cleans the row ahead of the opener 120 to remove plant debris from the previous growing season and the opener 120 opens a furrow in the soil. Gauge wheels 122 illustratively control a depth of the furrow, and seed is metered by seed metering system 114 and delivered to the furrow by seed delivery system 116. Closing wheels 124 close the trench over the seed. A downforce generator 131 can also be provided to controllably exert downforce to keep the row unit in desired engagement with the soil.

Figure 5:
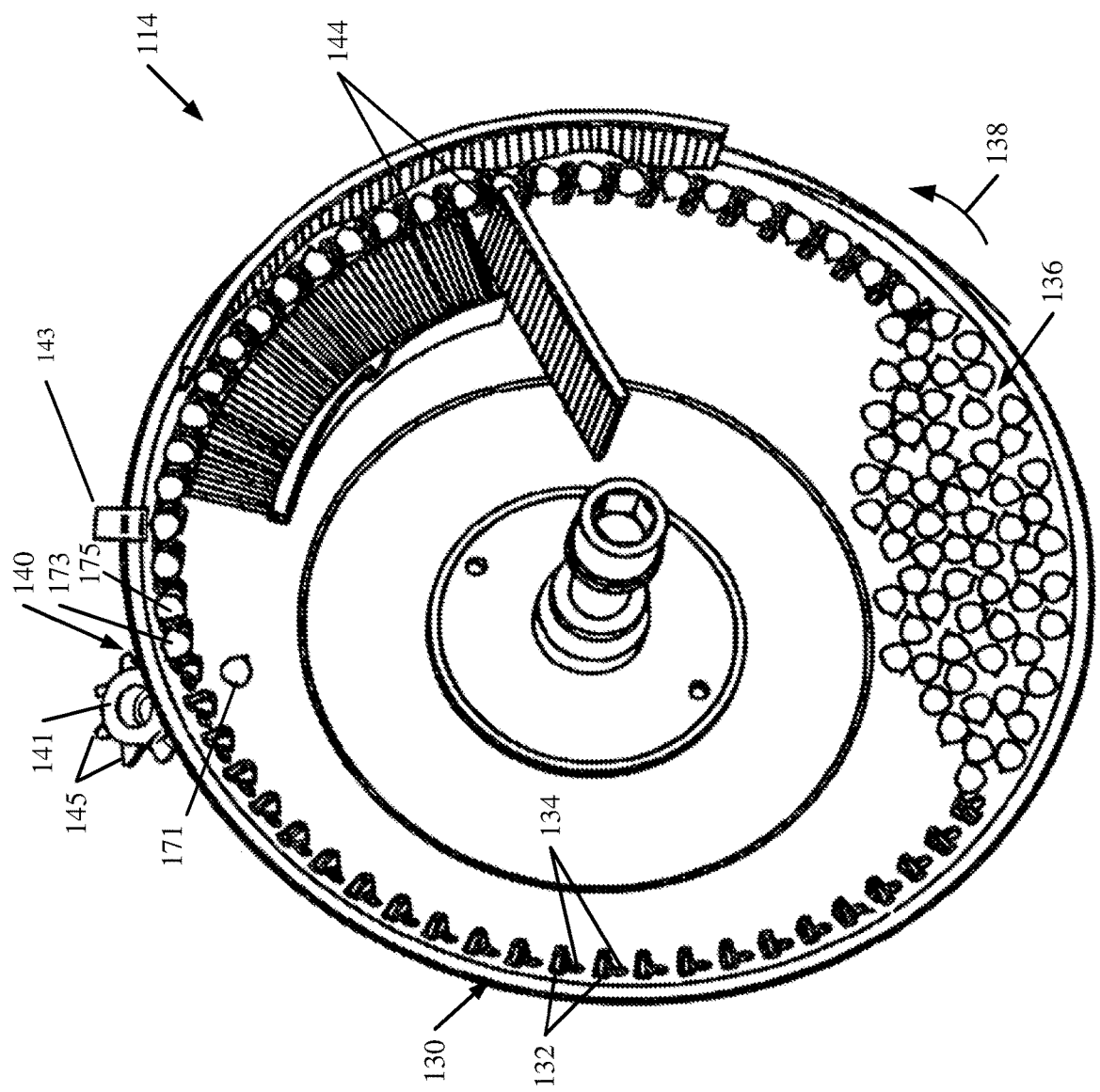
FIG. 5 is a perspective view of a portion of a seed metering system.

FIG. 5 shows one example of a rotatable mechanism that can be used as part of the seed metering system. The rotatable mechanism includes a rotatable disc, or concave element, 130. Rotatable element 130 has a cover (not shown) and is rotatably mounted relative to the frame 108 of the row unit 106. Rotatable element 130 is driven by a motor (shown in FIG. 8) and has a plurality of projections or tabs 132 that are closely proximate corresponding apertures 134. A seed pool 136 is disposed generally in a lower portion of an enclosure formed by rotating mechanism 130 and its corresponding cover. Mechanism 130 is rotatably driven by an actuator shown in FIG. 8, (such as an electric motor, a pneumatic motor, a hydraulic motor, etc.) for rotation generally in the direction indicated by arrow 138, about a hub. A pressure differential is introduced into the interior of the metering mechanism so that the pressure differential influences seeds from seed pool 136 to be drawn to apertures 134. For instance, a vacuum can be applied to draw the seeds from seed pool 136 so that they come to rest in apertures 134, where the vacuum holds them in place. Alternatively, a positive pressure can be introduced into the interior of the metering mechanism to create a pressure differential across apertures 134 to perform the same function.

Once a seed comes to rest in (or proximate) an aperture 134, the vacuum or positive pressure differential acts to hold the seed within the aperture 134 such that the seed is carried upwardly generally in the direction indicated by arrow 138, from seed pool 136, to a seed discharge area 140. It may happen that multiple seeds are residing in an individual seed cell. In that case, a set of brushes or other members 144 that are located closely adjacent the rotating seed cells tend to remove the multiple seeds so that only a single seed is carried by each individual cell. Additionally, a seed sensor 143 is also illustratively mounted adjacent to rotating mechanism 130.

Once the seeds reach the seed discharge area 140, the vacuum or other pressure differential is illustratively removed, and a positive seed removal wheel, knock-out wheel 141, can act to remove the seed from the seed cell. Wheel 141 illustratively has a set of projections 145 that protrude at least partially into apertures 134 to actively dislodge the seed from those apertures. When the seed is dislodged, it is illustratively moved by the seed delivery system 116 (two examples of which are shown below in FIGS. 6 and 7) to the furrow in the ground.

Figure 6:
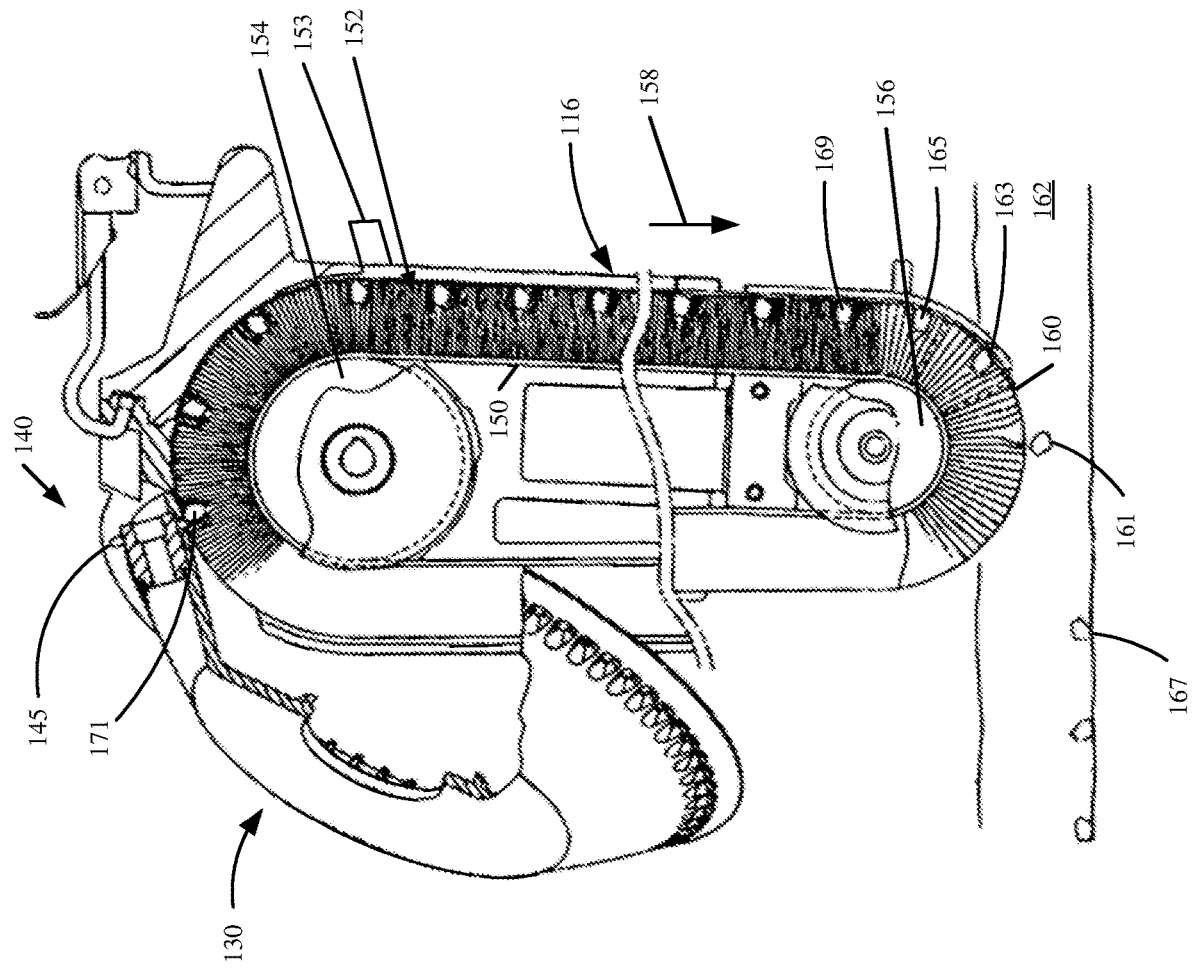
FIGS. 6 and 7 show two examples of different seed delivery systems that can be used with a seed metering system.

FIG. 6 shows an example where the rotating element 130 is positioned so that its seed discharge area 140 is above, and closely proximate, seed delivery system 116 which includes a seed transport mechanism. In the example shown in FIG. 6, the seed transport mechanism includes a continuous member, such as a belt 150 with a brush that is formed of distally extending bristles 152 attached to belt 150. Belt 150 is mounted about pulleys 154 and 156. One of pulleys 154 and 156 is illustratively a drive pulley while the other is illustratively an idler pulley. The drive pulley is illustratively rotatably driven by a conveyance motor (such as that shown in FIG. 8) which can be an electric motor, a pneumatic motor, a hydraulic motor, etc. Belt 150 is driven generally in the direction indicated by arrow 158.

Therefore, when seeds are moved by rotating element 130 to the seed discharge area 140, where they are discharged from the seed cells in rotating mechanism 130, they are illustratively positioned within the bristles (e.g., in a receiver) 152 by the projections 132 following each aperture that pushes the seed into the bristles. Seed delivery system 116 illustratively includes walls that form an enclosure around the bristles, so that, as the bristles move in the direction indicated by arrow 158, the seeds are carried along with them from the seed discharge area 140 of the metering mechanism, to a discharge area 160 either at ground level, or below ground level within a trench or furrow 162 that is generated by the furrow opener 120 on the row unit.

Additionally, a sensor 153 is also illustratively coupled to seed delivery system 116. As the seeds are moved within bristles 152, sensor 153 can detect the presence or absence of a seed. It should also be noted that while the present description will proceed as having sensors 143 and 153, it is expressly contemplated that, in another example, only one sensor is used. Additional sensors can also be used.

Figure 7:
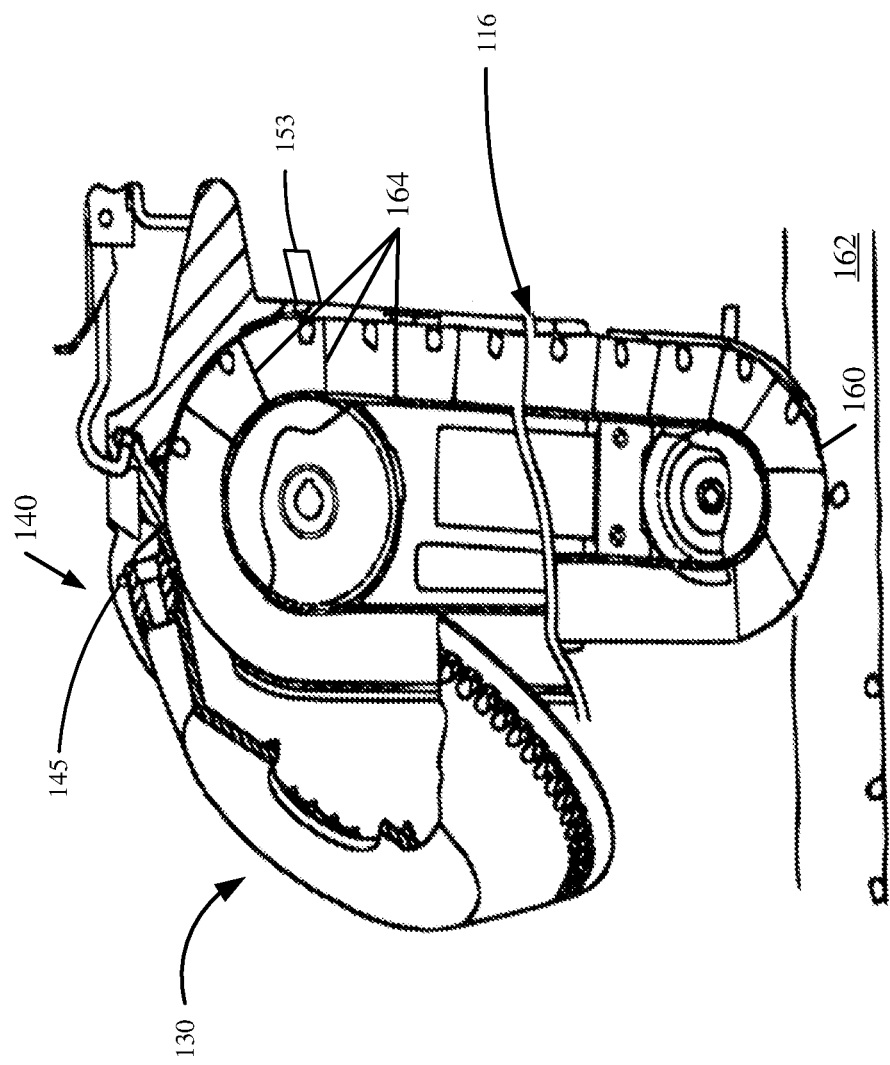

FIG. 7 is similar to FIG. 6, except that seed delivery system 116 is not formed by a belt with distally extending bristles. Instead, the transport mechanism includes a continuous member, such as a flighted belt in which a set of paddles 164 form individual chambers (or receivers), into which the seeds are dropped, from the seed discharge area 140 of the metering mechanism. The flighted belt moves the seeds from the seed discharge area 140 to the discharge area 160 within the trench or furrow 162.

There are a wide variety of other types of delivery systems as well, that include a gravity drop seed tube, and other forms of a transport mechanism and a receiver that receives a seed. For instance, they include dual belt delivery systems in which opposing belts receive, hold and move seeds to the furrow, a rotatable wheel that has sprockets which catch seeds from the metering system and move them to the furrow, multiple transport wheels that operate to transport the seed to the furrow, an auger, among others. The present description will proceed with respect to a brush belt, but many other delivery systems are contemplated herein as well.

Figure 8:
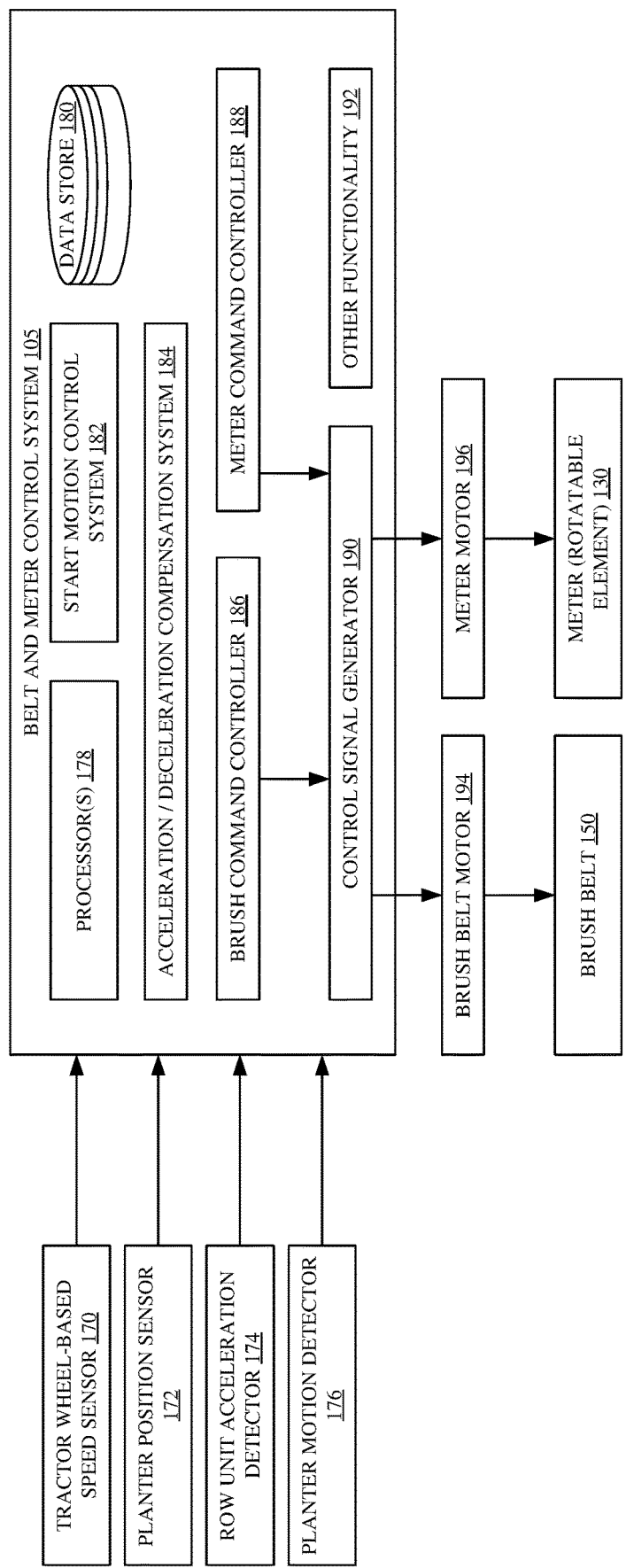
FIG. 8 is a block diagram showing one example of a belt and meter control system, in more detail.

FIG. 8 shows one example of belt and meter control system 105, in more detail. FIG. 8 refers to the seeding machine being a planter, but it can be any of the other types of seeding machines as well. FIG. 8 shows that belt and meter control system 105 can receive an input from a tractor wheel-based speed sensor 170 that senses the wheel speed of the tractor. Sensor 170 provides a signal indicative of the tractor wheel based speed to system 105.

FIG. 8 shows that system 105 also includes an input from planter position sensor 172. In one example, the row units 106 of machine 100 and/or the row units 48 shown in FIG. 1 can be raised (so that the planting elements are out of engagement with the soil), and lowered (so that they are in engagement with the soil, and positioned to generate a furrow for planting). Planter position sensor 172 illustratively generates a sensor signal indicative of the position of the planter, such as whether it is raised or lowered.

System 105 can also receive an input from a row unit acceleration detector 174. The acceleration detector 174 can be an accelerometer, an inertial measurement unit, or another type of detector or sensor that senses accelerations imparted on the row unit 106.

FIG. 8 also shows that system 105 receives an input from planter motion detector 176. Detector 176 generates a signal indicative of seeding machine wheel speed.

In FIG. 8, belt and meter control system 105 illustratively includes one or more processors 178, data store 180, start motion control system 182, acceleration/deceleration compensation system 184, brush command controller 186, meter command controller 188, control signal generator 190, and it can include a wide variety of other functionality 192. Start motion control system 182 generates outputs to brush command controller 186 and meter command controller 188 when the planter is starting operation (such as starting from a stand still) or is stopping. In normal operation, brush command controller 186 and meter command controller 188 do not command the brush belt 150 and meter 130 to rotate until the wheel speed of the planter reaches a threshold speed (such as 2000 meters per hour, by way of example).

However, during start up, this would mean that a seed gap would be left in the field when the planter starts up, until it reaches the threshold speed. Therefore, start motion control system 182 provides outputs to brush command controller 186 and meter command controller 188 so that they command the brush belt motor 194 and meter motor 196 to drive motion of brush belt 150 and meter 130, even when the planter wheel speed is below the threshold level (as indicated by planter motion detector 176). The operation of start motion control system 182 is described in greater detail below.

Acceleration/deceleration compensation system 184 detects rapid accelerations and decelerations which would otherwise result in too high a seed rate (during a rapid deceleration) or too low a rate (during a rapid acceleration) due to the lag between detecting the acceleration or deceleration and controlling the brush belt motor 194 and meter motor 196 accordingly. Thus, based on row unit accelerations detected by acceleration detector 174, acceleration/deceleration compensation system 184 compensates the normal brush command signal output by brush command controller 186, and the normal meter command control signal output by meter command controller 188, by an adjustment level that is determined based upon the level of acceleration, the wheel based speed of the tractor 10, among other things. This is also described in greater detail below.

The command controllers 186 and 188 provide command signals to control signal generator 190 which generates control signals to control brush belt motor 194 and meter motor 196 based upon the received commands. Controllers 186 and 188 normally operate according to a normal speed matching control algorithm in which, as long as the planter is down and traveling at a sufficient threshold speed, motors 194 and 196 are controlled based on the speed of the planter.

Figure 9:
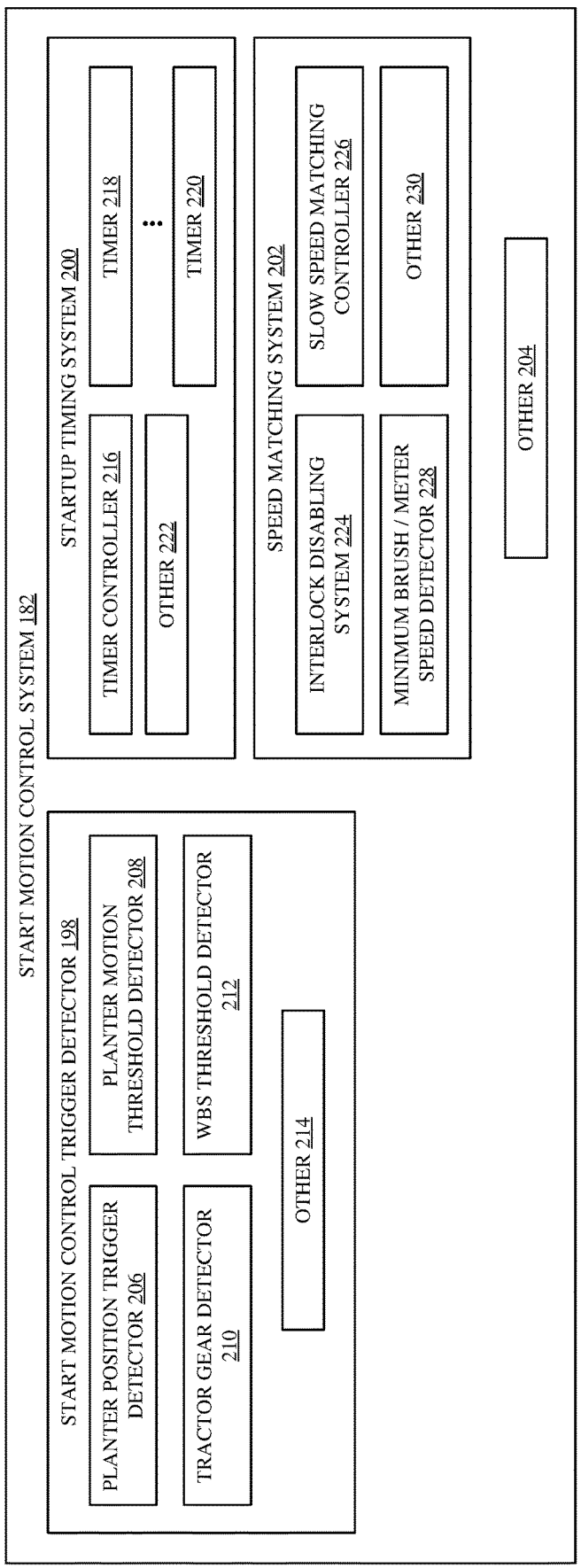
FIG. 9 is a block diagram showing one example of a start motion control system.

FIG. 9 is a block diagram showing one example of start motion control system 182, in more detail. FIG. 9 shows that system 182 illustratively includes start motion control trigger detector 198, startup timing system 200, speed matching system 202, and it can include a wide variety of other items 204. Start motion control trigger detector 198 detects certain start motion control triggers that trigger different operations in start motion control system 182. Planter position trigger detector 206 detects whether the planter position signal generated by sensor 172 indicates that the planter is raised or lowered. Planter motion threshold detector 208 determines whether the wheel speed of the planter has reached a threshold level. Tractor gear detector 210 detects whether the tractor 10 is in a forward or reverse gear. WBS threshold detector 212 detects whether the wheel based speed sensed by sensor 170 has reached a threshold level. Start motion control trigger detector 198 can include a wide variety of other functionality 214, as well. Startup timing system 200 illustratively includes a timing controller 216 that controls the operation of one or more different timers 218-220. System 200 can include other items 222 as well.

Speed matching system 202 illustratively generates outputs to brush command controller 186 and meter command controller 188 to generate command signals to control motors 194 and 196 based upon the wheel based speed of tractor 10, indicated by sensor 170. Thus, system 202 illustratively includes interlock disabling system 224, slow speed matching controller 226, minimum brush speed detector 228, and it can include other items 230.

It may be that belt and meter control system 105 includes speed-based interlocks so that, as briefly discussed above, brush belt motor 194 and meter motor 196 do not begin to turn and drive movement of brush belt 150 and meter 130, respectively, until certain things have taken place, such as that the planter has reached a certain wheel speed. There may be other interlocks that inhibit operation of brush belt motor 194 and meter motor 196 at low speeds (e.g., at speeds that may be encountered when starting from a stopped position). Thus, interlock disabling system 224 disables those interlocks so that the brush belt motor 194 and meter motor 196 can be commanded to rotate, even though the interlock conditions have not been met (e.g., even though the planter is traveling at a wheel speed that is below the threshold speed that enables operation).

Once the interlocks are disabled, slow speed matching controller 226 generates outputs to brush command controller 186 and meter command controller 188 so that the brush belt motor 194 and meter motor 196 are commanded to rotate at a speed that corresponds to the wheel speed of the tractor. Thus, even though the planter and tractor are traveling at a relatively slow speed, the brush belt motor 194 and meter motor 196 are commanded to rotate so that brush belt 150 and meter 130 are placing seed in the ground, even at slow speeds.

Minimum brush/meter speed detector 228 detects when the machine has accelerated to the point where the wheel speed of the planter has reached the minimum (or interlock) level so that brush command controller 186 and meter command controller 188 can perform normal operation where the motors 194 and 196 are commanded to rotate at a speed based on the wheel speed of the planter.

Figure 10:
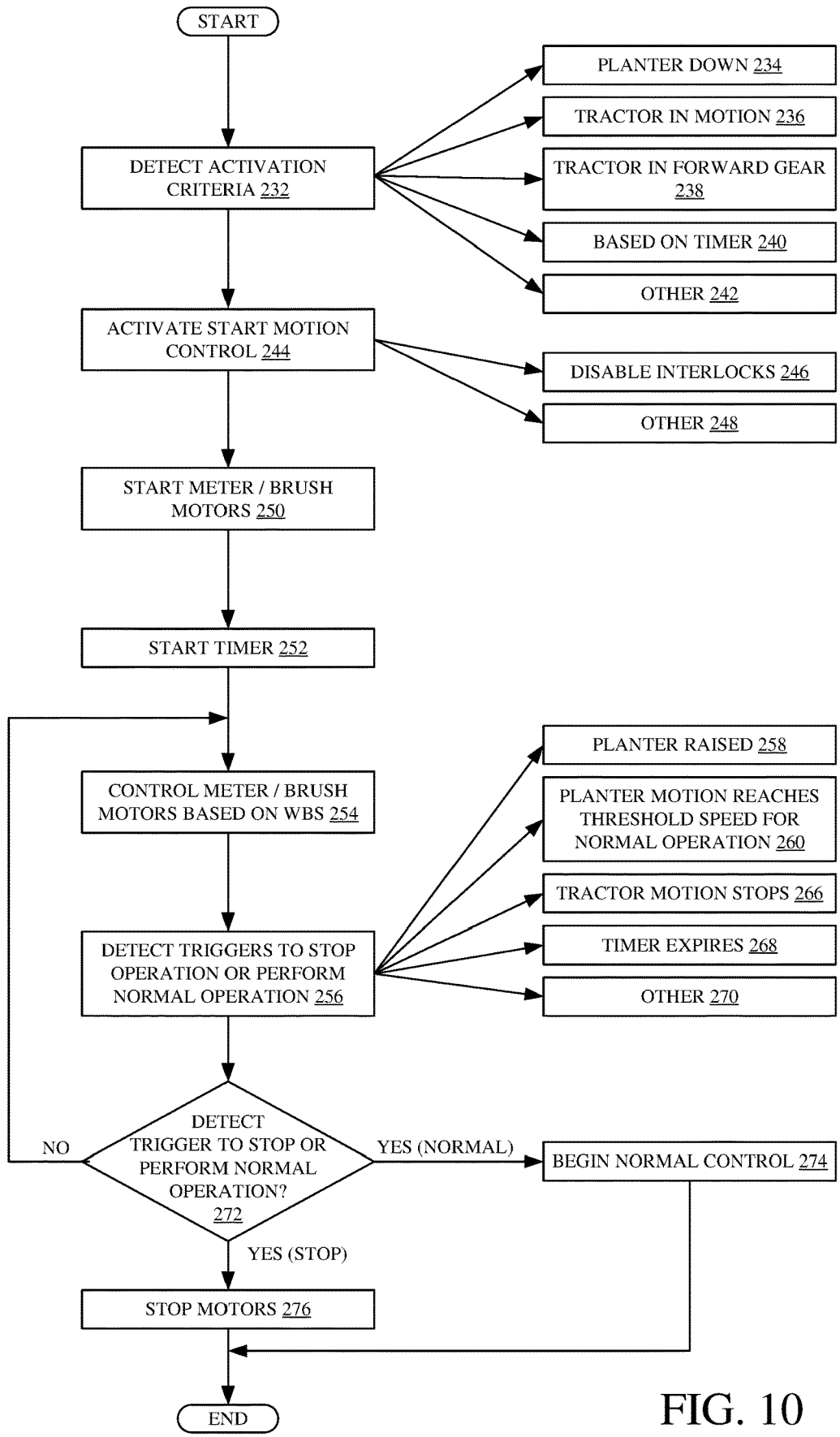
FIG. 10 is a flow diagram illustrating one example of the operation of the start motor control system shown in FIG. 9.

FIG. 10 is a flow diagram illustrating one example of the operation of start motion control system 182. In one example, brush command controller 186 and meter command controller 188 operate according to a normal speed matching algorithm so long as the wheel speed of the planter is above a threshold level. Acceleration/deceleration compensation system 184 can also compensate the command signals generated by controllers 186 and 188 based upon sensed accelerations and decelerations.

However, start motion control system 182 will be enabled, and activated, under certain circumstances, such as when the planter is about to start planting from a complete stop. System 182 controls the planter, under those circumstances, to control or reduce or eliminate the starting seed gap that normally accompanies the starting of operation of the planter. Thus, in FIG. 10, start motion control trigger detector 198 first detects whether the activation criteria are present in order to enable and activate start motion control system 182. This is indicated by block 232 in the flow diagram of FIG. 10. For example, the activation criteria can include that the planter is in the down position, as indicated by planter position trigger detector 206 and block 234 in the flow diagram of FIG. 10. The activation criteria can also include that the tractor is in motion based on a signal from wheel based speed (WBS) threshold detector 212. Using tractor motion as an activation criteria is indicated by block 236. The activation criteria can also include that the tractor is in a forward gear. This may be detected by tractor gear detector 210. Using the tractor gear as an activation criterion is indicated by block 238. The activation criteria can be based on a timer output from one of timers 218-220. This is indicated by block 240 in the flow diagram of FIG. 10. The activation criteria can include a wide variety of other items as well, and this is indicated by block 242.

Once the activation criteria are detected, a signal indicative of this is provided from detector 198 to speed matching system 202. This causes interlock disabling system 224 to disable any interlocks that would interfere with speed matching system 202 providing outputs to control the brush belt motor 194 and meter motor 196 during the startup of the planter. Activating the start motion control system is indicated by block 244, and disabling the interlocks is indicated by block 246. The start motion control system can be activated in other ways as well, and this is indicated by block 248.

Speed matching system 202 generates a signal to brush command controller 186 and meter command controller 188 to start rotation of the brush belt 150 and meter 130. This is indicated by block 250. Timer controller 216 sets a timer 218, and this is indicated by 252. Slow speed matching controller 226 then generates outputs to brush command controller 186 and meter command controller 188 so that the brush belt motor 194 and meter motor 196 are controlled during the slower speeds while the planter is accelerating to its normal operating speed. Controlling the meter and brush based on the tractor wheel based speed, even during the slower speeds, is indicated by block 254 in the flow diagram of FIG. 10.

This continues until trigger detector 198 detects a trigger to either stop operation, or to switch to normal speed matching operation. This is indicated by block 256. For instance, if the planter is raised, this would indicate that the brush belt motor 194 and meter motor 196 should be controlled to stop. This is indicated by block 258. In another example, if the planter wheel speed or motion reaches the threshold speed for normal operation, then the start motion control system 182 has completed its operation, because it has controlled the brush belt motor 194 and meter motor 196 during the entire startup acceleration so that normal speed matching operation can now be commenced by brush command controller 186 and meter command controller 188. Switching to normal operation based on reaching the planter motion speed threshold is indicated by block 260 in the flow diagram of FIG. 10. In addition, if trigger detector 198 detects that the tractor motion has stopped, as indicated by block 266, then this will indicate that the start motion control system 182 should again stop the motors 194 and 196.

If the timer expires (that was set at block 252) then this may trigger start motion control system 182 to stop the motors 194 and 196 as well. This is indicated by block 268. Other triggers can be detected to stop operation or perform normal operation as well, and this is indicated by block 270. If no trigger has yet been detected that would indicate operation is to stop or switch to normal speed matching operation, then, at block 272 processing reverts back to block 254 where the meter and brush are controlled based on the wheel based speed from the tractor. If, at block 272, a trigger is detected that normal speed matching control should commence, then system 182 stops controlling brush command controller 186 and meter command controller 188, so that they can switch to normal speed matching control. This is indicated by block 274. If, at block 272, a trigger is detected indicating that start motion control system 182 should simply stop the motion of motors 194 and 196, then those motors are stopped, as indicated by block 276.

Figure 11:
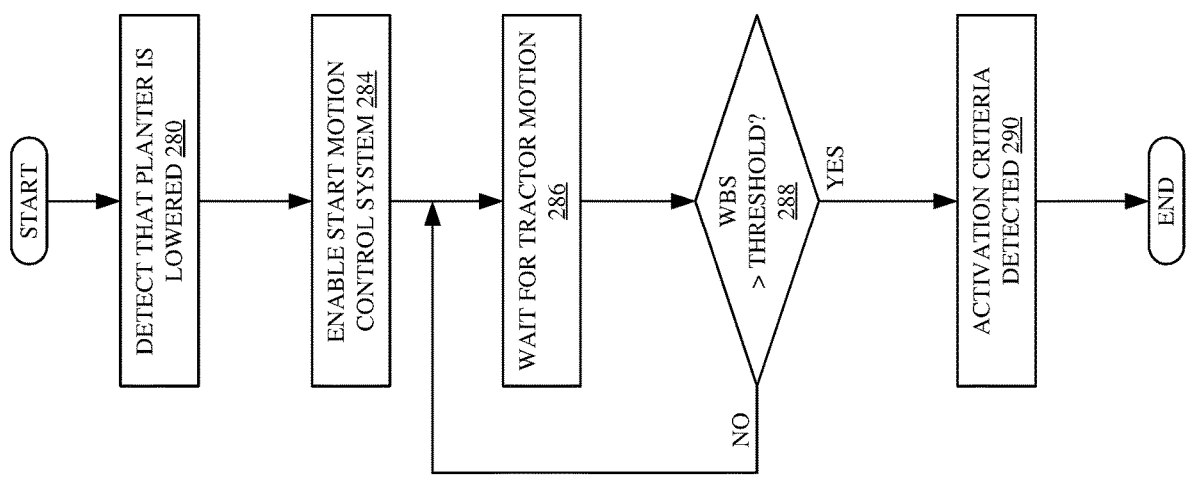
FIG. 11 is a flow diagram illustrating one example of the operation of the start motor control system and detecting activation criteria.

FIGS. 11-16 show flow diagrams illustrating different scenarios in which different enablement and activation detectors are used to detect the activation criteria at block 232 in the flow diagram of FIG. 10. FIG. 11 shows a flow diagram illustrating how the activation criteria are met by detecting that the planter is in the down position, and based on the WBS from the tractor 10. Planter position trigger detector 206 first detects that the planter is in the lowered position. This is indicated by block 280 in the flow diagram of FIG. 11. When this is detected, the start motion control system 182 is enabled, meaning that interlock disabling system 224 disables any interlocks that would inhibit system 182 from controlling motors 194 and 196 at low wheel speeds. Enabling the start motion control system 182 based upon the planter being lowered is indicated by block 284.

Speed matching system 202 then waits for the tractor motion (WBS) to reach a threshold level. This is indicated by block 286. Until the threshold level is reached, as indicated by block 288, processing reverts to block 286. By way of example, it may be that even the slowest operation of motors 194 and 196 will result in over seeding unless tractor 10 is going at least a threshold speed. Thus, the system waits for that speed to be reached (e.g., 500 m/hr) before beginning even slow speed matching. However, once the WBS threshold has been reached, then all of the activation criteria are met, as indicated by block 290, and processing reverts to block 244 in the flow diagram of FIG. 10.

Figure 12:
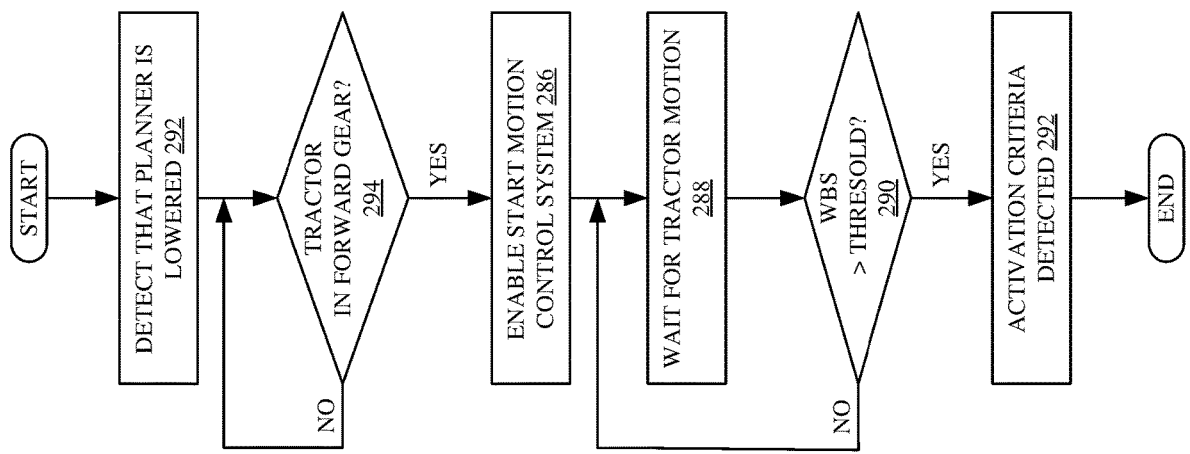
FIG. 12 is a flow diagram illustrating another example of the operation of the start motor control system in detecting activation criteria.

FIG. 12 is a flow diagram illustrating how the activation criteria are detected when the activation criteria are that the planter is in the down position, the tractor is in a forward gear, and that the WBS has reached a speed threshold value. Planter position trigger detector 206 first detects that the planter is in the lowered position. This is indicated by block 292 in the flow diagram of FIG. 12. Processing then waits until tractor gear detector 210 detects that the tractor 10 has been placed in a forward gear. This is indicated by block 294. Once that occurs, then speed matching system 202 is enabled, meaning that interlock disabling system 224 disables any relevant interlocks. This is indicated by block 286. Slow speed matching controller 226 then waits for the tractor motion (indicated by the WBS) to reach a threshold level. This is indicated by block 288. Once the WBS threshold level is reached, as indicated by 290, then all of the activation criteria are detected, and slow speed matching controller 226 begins controlling motors 194 and 196 based on the relatively slower WBS. This is indicated by block 292 in the flow diagram of FIG. 12.

Figure 13:
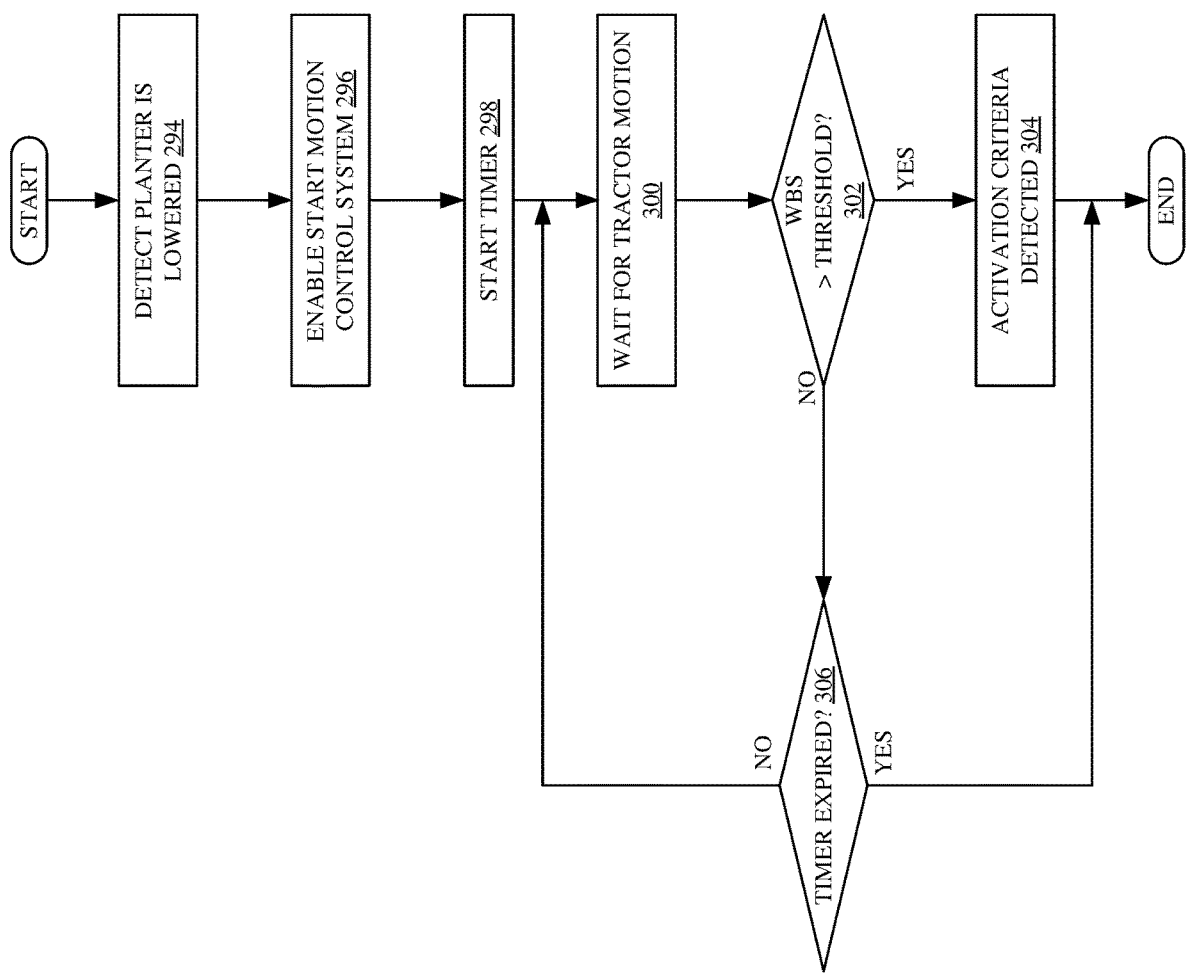
FIG. 13 is a flow diagram illustrating another example of the operation of the start motor control system in detecting activation criteria.

FIG. 13 is a flow diagram showing another example of how start motion control system 182 is enabled and activated. Planter position trigger detector 206 first detects that the planter is in the lowered position. This is indicated by block 294 in the flow diagram of FIG. 13. This enables start motion control system 182 so that interlock disabling system 224 disables the relevant interlocks. This is indicated by block 296. Timer controller 216 then starts a timer 218-220. This is indicated by block 298.

Speed matching system 202 then waits for WBS threshold detector 212 to detect that the tractor is moving at a threshold wheel speed (which, again, is slower than the normal operating speed of the planter which enables motors 194 and 196 to be actuated). This is indicated by block 300. If the tractor begins moving at a threshold wheel speed, as indicated by block 302, then the activation criteria are met, and speed matching system 202 begins controlling the brush belt motor 194 and meter motor 196. Detecting that the activation criteria are met is indicated by block 304.

If, at block 302, the tractor has not yet begun moving at a threshold speed, then timer controller 216 determines whether the timer is expired. This is indicated by block 306. If so, then the set start motion control system 182 stops the processing. If not, however, then processing reverts to block 300 where seed matching system 202 continues to wait for the tractor motion to reach the threshold speed.

Figure 14:
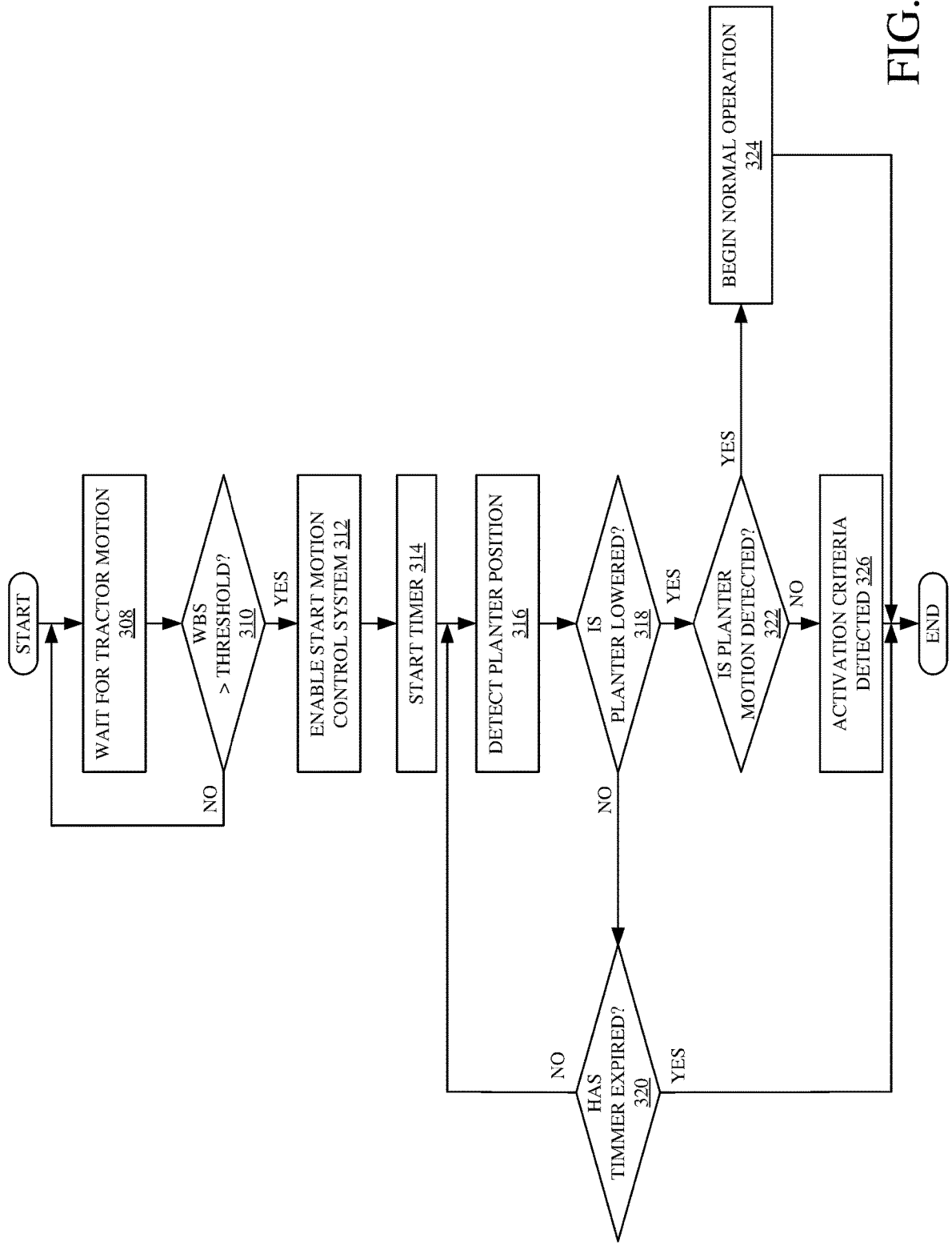
FIG. 14 is a flow diagram illustrating another example of the operation of the start motor control system in detecting activation criteria.

FIG. 14 is a flow diagram illustrating the operation of start motion control system 182 in detecting still another enabling an activation criteria. WBS threshold detector 212 first waits to determine whether the tractor has reached a threshold wheel speed. This is indicated by blocks 308 and 310 in the flow diagram of FIG. 14. If so, then the start motion control system 182 is enabled so that interlock disabling system 224 disables the relevant interlocks. This is indicated by block 312. Timer controller 216 then starts a timer 218 and speed matching system 202 waits until planter position threshold detector 206 detects that the planter has been lowered. Setting the timer is indicated by block 314 and detecting planter position is indicated by block 316. If, at block 318, it is determined that the planter is not yet in the lowered position, then time controller 216 determines whether the timer has expired. This is indicated by block 320. If not, processing reverts to block 316 where the planter position trigger detector 206 continues to detect planter position. If the timer has expired, then the operation of start motion control system 182 is ended.

If, at block 318, it is determined that the planter is in the lowered position, then planter motion threshold detector 208 determines whether planter motion is detected (e.g., whether the wheel speed of the planter has reached a threshold level so that normal speed matching operation can begin). This is indicated by block 322. If so, then normal speed matching is performed by brush command controller 186 and meter command controller 188. This is indicated by block 324. However, if the planter has not yet reached the threshold speed for normal speed matching, then speed matching system 202 is activated. That is, all the activation criteria have been met, so that slow speed matching controller 226 can control the brush belt motor 194 and meter motor 196 to deliver seed, even while the machine is operating at a relatively slow speed. Determining that the activation criteria have been detected is indicated by block 326 in the flow diagram of FIG. 14.

Figure 15:
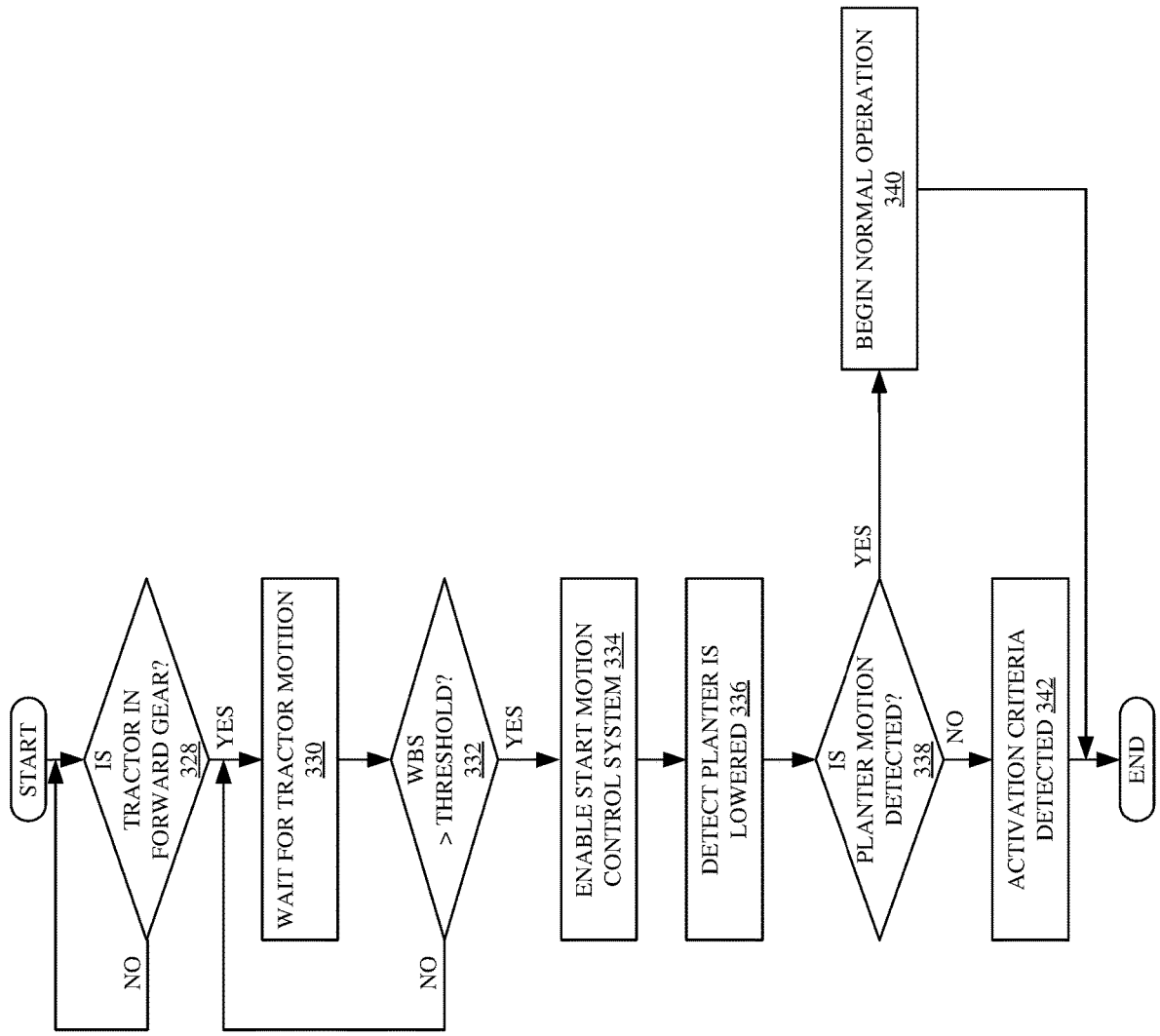
FIG. 15 is a flow diagram illustrating another example of the operation of the start motor control system in detecting activation criteria.

FIG. 15 is another flow diagram illustrating another example of how start motion control system 182 can operate to detect that it is enabled and that activation criteria have been met. Tractor gear detector 210 first determines whether the tractor is in a forward gear. This is indicated by block 328 in the flow diagram of FIG. 15. Once the tractor is placed in a forward gear, then WBS threshold detector 212 waits for the tractor to reach a threshold speed (yet still below the speed for normal speed matching operation). This is indicated by blocks 330 and 332. Once the tractor has reached the threshold speed, then start motion control system 182 is enabled so that interlock disabling system 224 disables the relevant interlocks. This is indicated by block 334.

When planter position trigger detector 206 detects that the planter is in the lowered position, as indicated by block 336, then planter motion threshold detector 208 determines whether the planter speed has reached a threshold speed so that normal speed matching operation can proceed. This is indicated by block 338. If so, then controllers 186 and 188 begin normal speed matching operation in controlling brush belt motor 194 and meter motor 196 based on the planter wheel speed. This is indicated by block 340. However, if the planter has been lowered, as indicated by block 336, but the planter motion threshold detector 208 determines that the speed of the planter has not reached the threshold level yet, then all of the activation criteria for activating start motion control system 182 have been met, as indicated by block 342, and slow speed matching controller 226 begins controlling brush belt motor 194 and meter motor 196 at the slower speeds.

Figure 16:
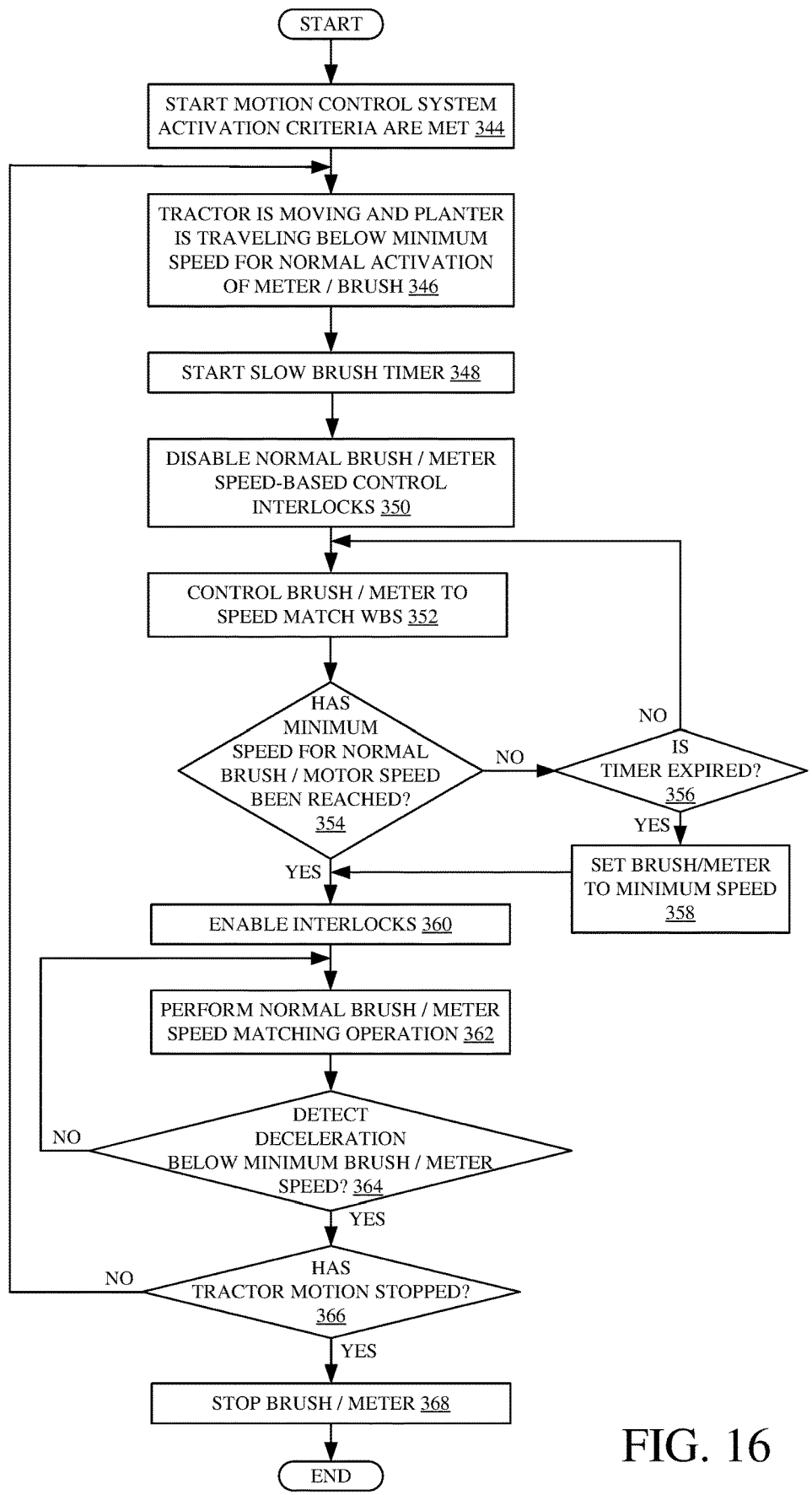
FIG. 16 is a flow diagram illustrating one example of the operation of a brush belt and meter during slow ground speeds.

FIG. 16 is a flow diagram illustrating the operation of brush belt motor 194 and meter motor 196 as they are controlled by slow speed matching controller 226, during times when the tractor has reached a threshold wheel speed and the planter is in the lowered position, but the planter has not reached a threshold speed where normal speed matching operation is performed. Thus, FIG. 16 shows one example of the operation of slow speed matching controller 226 during those times.

It is first assumed that the start motion control system activation criteria are met. Some examples of how this can be determined are discussed above with respect to FIGS. 11-15. Determining that the activation criteria are met is indicated by block 344 in the flow diagram of FIG. 16. It is also assumed that the tractor 10 is moving but the planter is traveling below the minimum speed (or threshold speed) for normal activation of the motors 194 and 196. This is indicated by block 346. Timer controller 216 first starts a slow brush timer 220. This is indicated by block 348. The timers discussed herein may be set for any desired time value, such as a value in the range of 5-10 seconds or a different time value. This can be set based on operation preference, set empirically or in other ways.

Interlock disabling system 224 then disables the brush/meter speed-based control interlocks which inhibit operation of the motors 194 and 196 until the planter has reached its threshold speed for normal speed matching operation. Disabling the interlocks is indicated by block 350.

Slow speed matching controller 226 then begins controlling the brush 150 and meter 130 (through controllers 186 and 188 and motors 194 and 196) to rotate at a speed that corresponds to, or matches, the WBS of tractor 10. This is indicated by block 352. For instance, once the WBS has reached a threshold value, then slow speed matching controller 226 can activate motors 194 and 196 at relatively slow speeds that correspond to the slower WBS speed of the tractor and planter. The threshold WBS is set at a level so that the slow operation of the belt 150 and meter 130 do not provide seed at too high a seeding rate. Therefore, in one example, the WBS threshold is set at 500 meters per hour, but any other desired threshold can be used as well. The threshold can be determined empirically, or by modeling, or through other means.

Thus, as the tractor accelerates from a stop, to the normal planting speed, slow speed matching controller 226 controls the brush belt motor 194 and meter motor 196 so that they also accelerate in a way that corresponds to the acceleration of the tractor 10. Minimum brush/meter speed detector 228 continues to detect whether the planter speed has reached a threshold value so that normal brush/meter speed matching can be performed. This is indicated by block 354.

If not, then timer controller 216 checks to determine whether the slow brush timer 220 has expired. This is indicated by block 356. If the time has not expired, then processing reverts to block 352 where slow speed matching controller 226 continues to control the brush belt 150 and meter 130 at the slower speeds. If the time has expired, then speed matching system 202 sets the brush speeds to their minimum speeds, as indicated by block 358.

If the planter has reached the minimum speed threshold, or once the brush and meter are set to their minimum speeds (during normal speed matching) at block 358, then interlock disabling system 224 enables the speed-based interlocks. This is indicated by block 360. Control is then shifted to brush command controller 186 and meter command controller 188 which perform normal brush/meter speed matching operation, until the tractor 10 and/or planter decelerate so that their speed is below the normal minimum brush/meter speed threshold. Performing normal operation is indicated by block 362 and determining whether the machine has decelerated to a speed that is below the normal minimum threshold speed for operating motors 194 and 196 is indicated by block 364.

If the deceleration has occurred, then WBS threshold detector 212 determines whether the tractor has stopped or dropped below the lower threshold speed that is used for performing slow speed matching. This is indicated by block 366. If the tractor is below the normal speed threshold for controlling the brush and meter, but is above the minimum speed threshold for performing slow speed matching, then processing reverts to block 346 where the slow speed matching is again initiated and performed by start motion control system 182. However, if, at block 366, it is determined that the tractor 10 has stopped or that its speed is below the speed threshold for performing slow speed matching, then control system 105 stops the brush 150 and meter 130. This is indicated by block 368.

Figure 17:
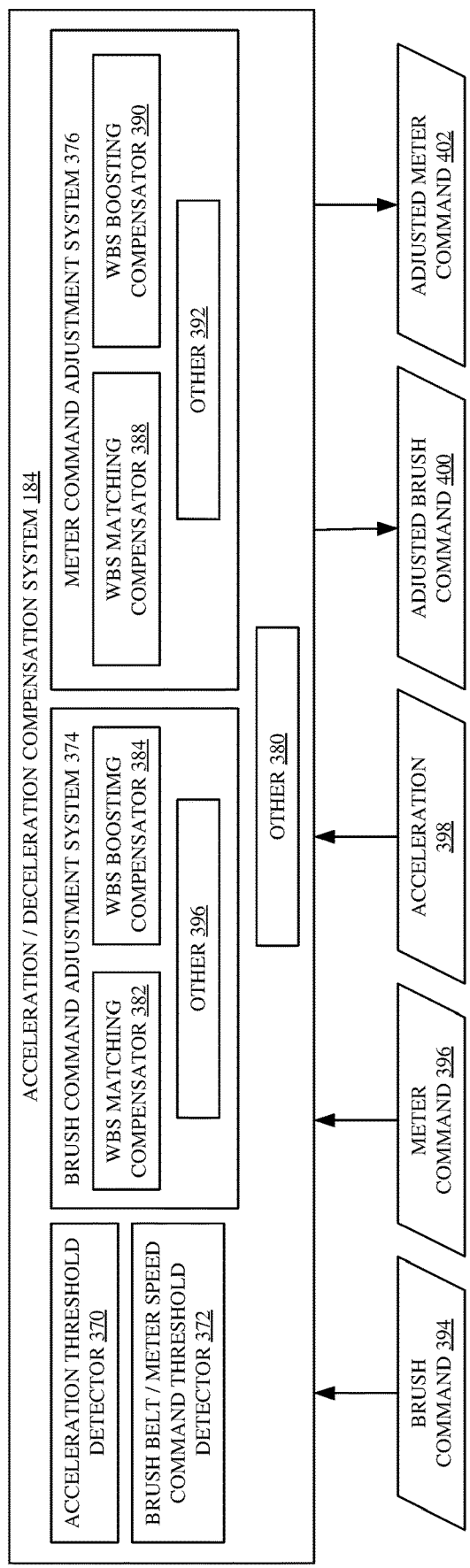
FIG. 17 is a block diagram showing one example of an acceleration/deceleration compensation system, in more detail.

FIG. 17 is a block diagram showing one example of acceleration/deceleration compensation system 184 (shown in FIG. 8). System 184 illustratively includes acceleration threshold detector 370, brush belt/meter speed command threshold detector 372, brush command adjustment system 374, meter command adjustment system 376, and it can include a wide variety of other items 380. Brush command adjustment system 374 can include one or both of WBS matching compensator 382 and WBS boosting compensator 384. It can include other items 386 as well. Meter command adjustment system 376 can include one or both of WBS matching compensator 388, and WBS boosting compensator 390. It can also include other items 392. FIG. 17 also shows that system 184 receives the brush command 394 from brush command controller 186 along with the meter command 396 from meter command controller 188. It receives an acceleration value 398 from row until acceleration detector 174.

By way of overview, system 184 receives the brush command 394 and meter command 396 and determines whether the acceleration 398 meets a threshold value. If so, system 184 generates an adjusted brush command 400 and an adjusted meter command 402 to compensate for the accelerations or decelerations that are being imparted on the row unit 106 where row unit acceleration detector 174 is mounted. Before describing the overall operation of system 184 in more detail, a brief description of some of the items in system 184, and their operation, will first be provided.

There may be some accelerations that are due to factors, such as sensor offset. Therefore, acceleration threshold detector 370 determines whether the acceleration has sufficient magnitude that adjustment can be confidently applied. In one example, the acceleration threshold is +/−0.45 m/s². Therefore, when the detected accelerations indicated by acceleration signal 398 meet that threshold, then system 184 generates compensation or adjustment values for the brush command 394 and meter command 396 to achieve more accurate seed spacing. Thus, acceleration threshold detector 170 receives the acceleration signal 398 and determines whether the acceleration meets a threshold acceleration value. Brush belt/meter speed command threshold detector 372 can receive the brush command 394 and meter command 396 and determine whether they are above a minimum command threshold. Brush command adjustment system 374 adjusts the brush command 394 based upon the detected accelerations that exceed the acceleration threshold. WBS matching compensator 382 can generate a compensation value based on the accelerations. WBS boosting compensator 384 can generate a compensation value that matches a tractor wheel speed that occurred a short time prior to the current wheel speed. This is discussed in greater detail below.

Meter command adjustment system 376 generates an adjustment to meter command 396 based on the acceleration. Again, WBS matching compensator 388 can generate an adjustment value based on a current WBS, while WBS boosting compensator 390 can generate an adjustment value based on a WBS that preceded the current WBS by a threshold amount of time. Command threshold detector 372 then detects whether the adjusted commands meet a minimum command threshold and, if so, outputs the adjusted brush command 400 and adjusted meter command 402. By compensating the brush command and meter command, compensation system 184 maintains more accurate seed spacing during acceleration and deceleration of the planter.

There are several mechanisms by which the adjustments can be made. For instance, if the acceleration meets the threshold value, then the meter/brush commands may be adjusted by a percentage. The percentage may depend on the value of the acceleration. For instance, if the acceleration is between 0.5 and 1 m/s² or between 1 and 1.5 m/s², then the adjustment may differ. Higher accelerations result in a larger adjustment.

Another mechanism adjusts the meter and brush commands by a constant value. The constant value may be based upon the acceleration so that higher accelerations result in a larger adjustment.

Yet another mechanism for generating adjustments adjusts the meter and brush commands according to a current acceleration and a pre-evaluated system delay. For instance, if the wheel speed has a value of x and the acceleration has a value of y, then the true speed may be a value of z, after inherent system delays. The adjustment can be based on the value Z.

Another mechanism, which is described in greater detail below, adjusts the meter and brush commands when the acceleration value reaches the threshold, according to a linear best fit equation that best fits a plot of acceleration and necessary rpm adjustments to the belt and meter commands. This is represented by Equation 1 below.

$$\text{Adjusted Command} = \text{Current Command} + (\text{Slope} \cdot \text{Acceleration} + \text{Intercept}) \quad \text{Eq. 1:}$$

Figure 18:
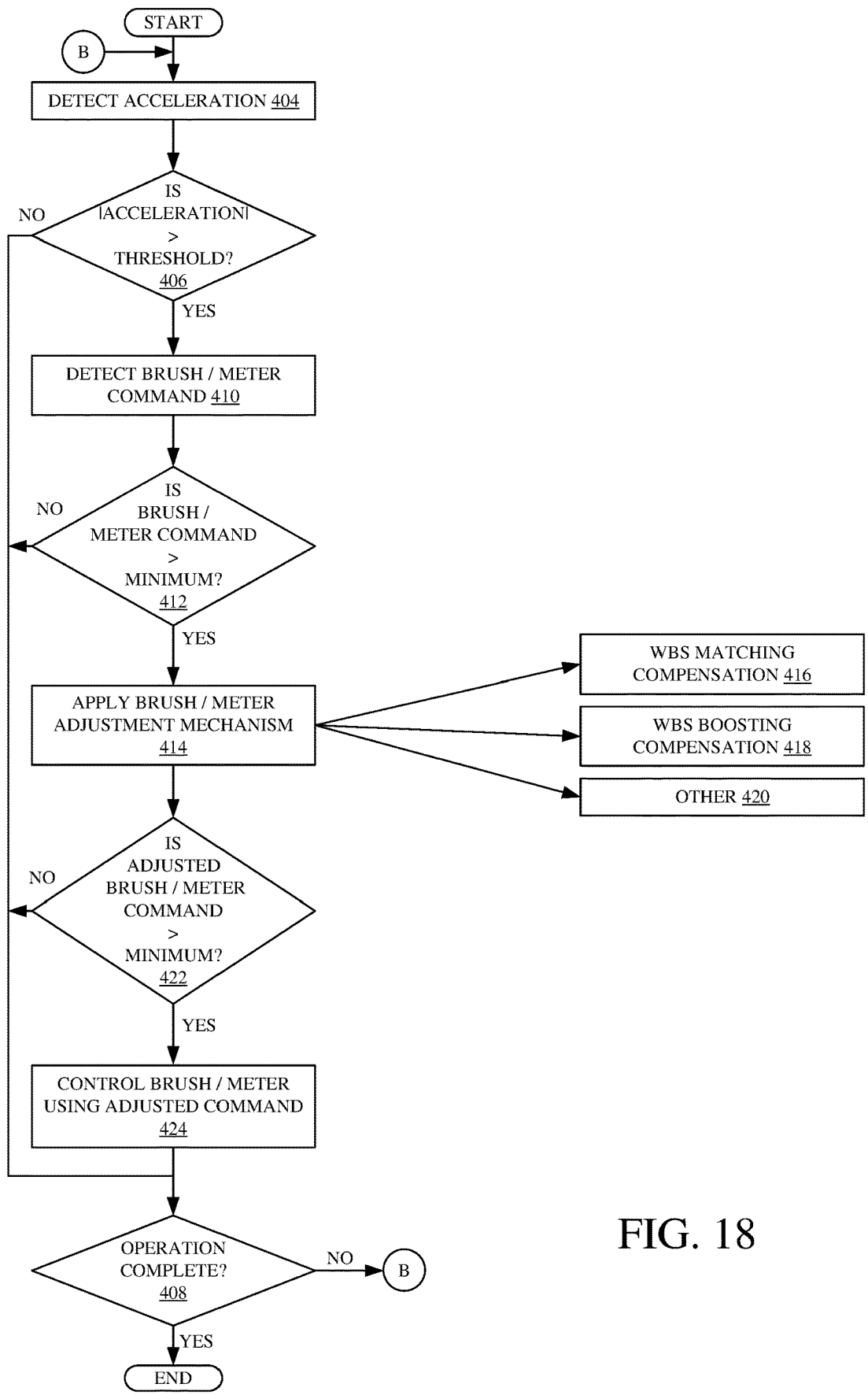
FIG. 18 is one example of the operation of the acceleration and deceleration compensation system.

In one example, systems 374 and 376 output an adjusted brush command 400 and an adjusted meter command 402 as indicated by Equations 2 and 3 below:

Adjusted Brush Command=Current Brush Command+(174.1141*Acceleration−1.7919)  Eq. 2:

Adjusted Meter Command=Current Meter Command+(85.1722*Acceleration−1.5342)  Eq. 3:

Also, in one example, the WBS boosting compensators 384 and 390 output an adjusted brush command 400 and an adjusted meter command 402 as indicated by Equations 4 and 5 below:

Boosted Brush Command=Current Brush Command+(289.0575*Acceleration−19.8)  Eq. 4:

Boosted Meter Command=Current Meter Command+(142.6933*Acceleration−8.7739)  Eq. 5:

One way of deriving these adjustment mechanisms is described in greater detail below with respect to FIGS. 19 and 20. First, however, the operation of acceleration/deceleration compensation system 184 will be described in more detail. FIG. 18 is one example of this.

Acceleration threshold detector 370 first detects the acceleration 398. This is indicated by block 404 in the flow diagram of FIG. 18. Acceleration threshold detector 370 then determines whether the absolute value of the acceleration (e.g., whether the magnitude of an acceleration or deceleration) meets a threshold value. This is indicated by block 406. For example, relatively small acceleration magnitudes may be due to factors such as sensor displacement or other factors where the brush and meter commands need not be adjusted. However, higher accelerations may desirably lead to brush and meter speed adjustments. Therefore, the threshold can be empirically set or set through modeling or otherwise. In one example, the threshold is 0.4 m/s$^2$, but it could be other values as well.

If the acceleration does not meet the threshold value, then operation switches to block 408 where processing simply continues until another acceleration is detected or the planting operation is complete.

However, if, at block 406, it is determined that the acceleration magnitude does meet the threshold value, then the brush and meter commands 394 and 306, respectively, are detected and brush belt/meter speed command threshold detector 372 determines whether those commands are greater than a minimum speed command. If the commands are at the minimum speed commands for the brush belt and meter, then, again, processing skips to block 408. Detecting the brush and meter commands and determining whether they meet a minimum command value is indicated by blocks 410 and 412, respectively, in FIG. 18.

Assuming that, at block 412, brush belt/meter speed command threshold detector 372 detects that the brush command 394 and/or meter command 396 are above the minimum value, then brush command adjustment system 374 applies an adjustment value to brush command 394, and meter command adjustment system 376 applies an adjustment value to meter command 396. This is indicated by block 414. In one example, the adjustment value can be generated using WBS matching compensator 382 and 388, as indicated by Equations 2 and 3 above. This is indicated by block 416 in the flow diagram of FIG. 18. The adjustments can be provided by WBS boosting compensators 384 and 390, as illustrated in Equations 4 and 5 above. This is indicated by block 418 in the flow diagram of FIG. 18. Other adjustments mechanisms can be applied to provide other adjustment values as well, and this is indicated by block 420.

Brush belt/meter speed command threshold detector 372 then again detects whether the adjusted brush and meter commands meet the minimum threshold commands to command the brush belt 150 and meter 130. This is indicated by block 422 in the flow diagram of FIG. 18. If not, again processing skips to block 408. However, if the adjusted commands meet the minimum threshold for commanding the brush belt 150 and meter 130, then processing moves to block 424 where systems 374 and 376 output the adjusted brush command 400 and adjusted meter command 402, respectively.

Figure 19:
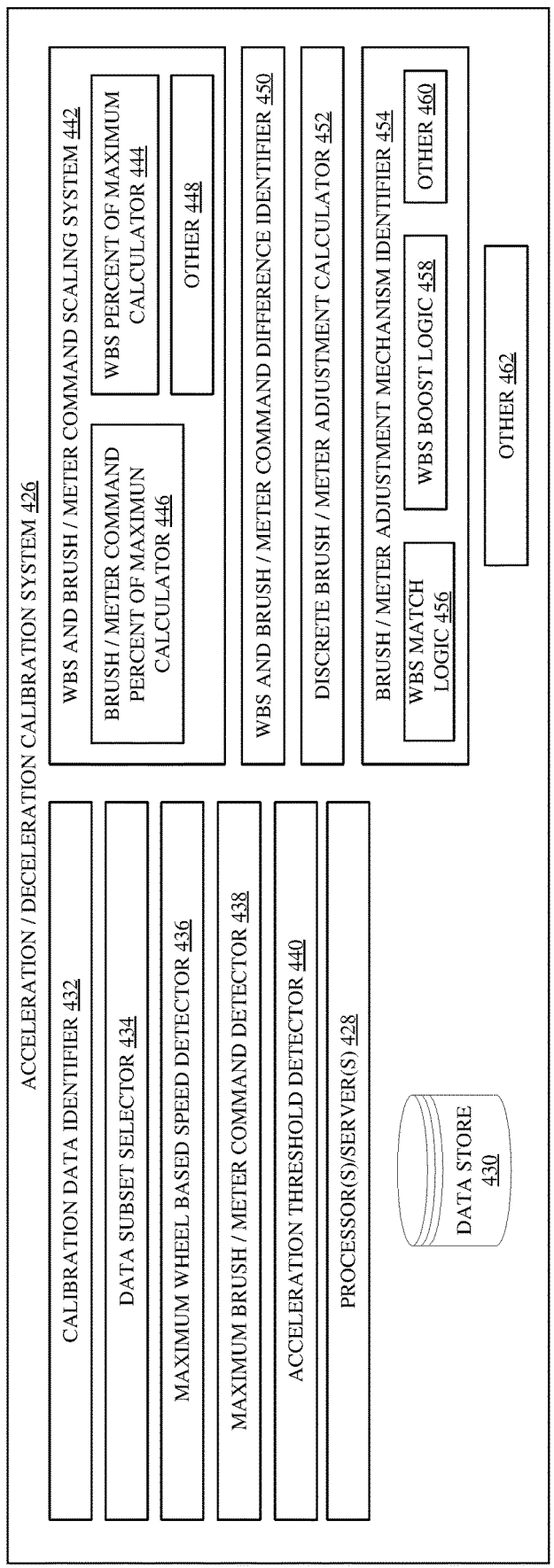
FIG. 19 is a block diagram showing one example of an acceleration/deceleration calibration system.

FIG. 19 is a block diagram showing one example of an acceleration/deceleration calibration system 426. System 426 can be located on a remote server (e.g., in the cloud) or elsewhere. System 426 can be used to obtain the adjustment mechanisms shown in the equations set out above. System 426 illustratively includes one or more processors or servers 428, data store 430, calibration data identifier 432, data subset selector 434, maximum wheel base speed detector 436, maximum brush/meter command detector 438, acceleration threshold detector 440, WBS and brush/meter command scaling system 442 (which, itself, can include WBS percent of maximum calculator 444, brush/meter command percent of maximum calculator 446, and other items 448), WBS and brush/meter command difference identifier 450, discrete brush/meter adjustment calculator 452, and brush/meter adjustment equation identifier 454 (which can include WBS match logic 456, WBS boost logic 458, and other items 460). System 426 can include a wide variety of other items 462 as well.

Calibration data identifier 432 first identifies a set of data that will be used to generate the adjustment mechanisms (or adjustment equations). For instance, it may be that the planter has made a certain number of runs through a field, and the acceleration, speed and command data, as well as other calibration data, has been collected for those runs. Data subset selector 434 selects a subset of that data from which to begin generating the adjustment mechanisms. For instance, it may select data corresponding to a single run, from the identified calibration data.

Maximum wheel based speed detector 436 then identifies a maximum WBS for the selected subset of data (e.g., for the selected run). Maximum brush/meter command detector 438 detects the maximum brush and meter commands (e.g., the maximum speed commands) for the subset of data. Acceleration threshold detector 440 then iterates through the subset of data to identify points where the accelerations on the row unit 106 meet the acceleration threshold (e.g., 0.4 m/s$^2$ or a different threshold). For each of those instances, WBS and brush/meter command scaling system 442 scales the WBS, at that time (or 0.3 seconds ahead of that time) and brush/meter command percent of maximum calculator 446 calculates a percent of the maximum command that the brush/meter commands represented, at the time of the acceleration (WBS percent of maximum calculator 444 calculates the percent of the maximum WBS that the current WBS, at the time of the acceleration or 0.3 seconds ahead of that time, represents).

In this way, WBS and brush/meter command scaling system 442 places both the WBS and the brush and meter commands on the same scale (0-100%). WBS and brush/meter command difference identifier 450 then identifies the percent difference between the current WBS and the current brush and meter commands (current meaning at the time of the acceleration). For instance, the percent difference can be the WBS percent generated by calculator 444 minus the brush percent generated by calculator 446, and the difference of the WBS percent generated by calculator 444 and the meter command percent generated by calculator 446.

Discrete brush/meter adjustment calculator 452 then identifies a discrete brush command adjustment and meter command adjustment. It can do this based on the WBS at the time of the acceleration or the WBS 0.3 seconds ahead of the time of the acceleration.

Brush/meter adjustment mechanism identifier 454 then plots the brush and meter adjustments (for all points with an acceleration value that is greater than the acceleration threshold) against the concurrent accelerations. A generally linear relationship appears between the acceleration and the adjustment values, with larger accelerations requiring larger adjustments. A line of best fit can then be determined from the plots of both the brush adjustment vs. acceleration and meter adjustment vs. acceleration plots.

In one example, WBS match logic 156 generates Equation 2 that represents the line of best fit for the brush commands, and Equation 3 that represents the line of best fit for the meter commands. Thus, Equations 2 and 3 represent the brush and meter adjustment mechanisms, respectively, that are output by WBS match logic 456.

As briefly mentioned above, matching the meter and brush commands to the WBS (using the WBS match logic) still results in slightly delayed raw meter/brush speeds. These delays have been observed, in one example, to be on the order of 0.3 seconds for both the meter and the brush. Thus, the WBS boost logic 458 identifies the line of best fit for the data where the meter and brush RPM commands are 0.3 seconds ahead of the WBS. These mechanisms are represented by Equations 4 and 5.

Figure 20:
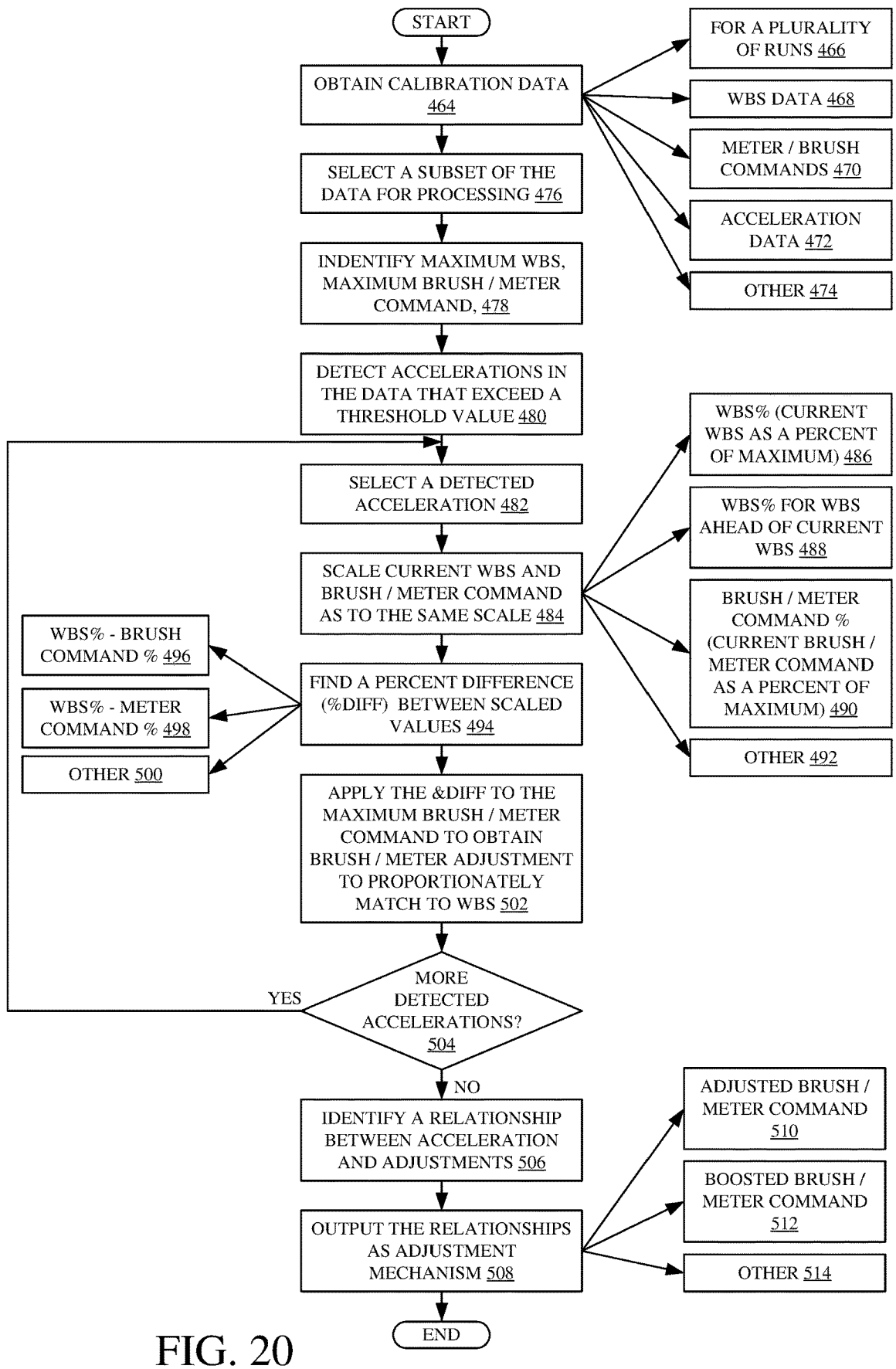
FIG. 20 is a flow diagram illustrating one example of the operation of the acceleration/deceleration calibration system in identifying adjustment mechanisms for adjusting the brush and meter commands.

FIG. 20 is a flow diagram illustrating one example of the operation of acceleration/deceleration calibration system 426 in identifying the adjustment mechanisms, in more detail.

Calibration data identifier 432 first obtains a set of calibration data that can be used to identify the adjustment mechanisms. This is indicated by block 464 in the flow diagram of FIG. 18. The calibration data can correspond to a plurality of runs of the planter through one or more fields. This is indicated by block 466. It can include the WBS data 468 and meter/brush command data 470, as well as acceleration data 472 and it can include a wide variety of other data 474.

Data subset selector 434 then selects a subset of the data for processing. This is indicated by block 476. In one example, data subset selector 434 selects data for a single run through the field.

Maximum wheel based speed detector 436 detects the maximum WBS for the subset of data, while maximum brush/meter command detector 438 detects the maximum brush and meter commands in the subset of data. This is indicated by block 478.

Acceleration threshold detector 440 then iterates through the subset of data to detect accelerations in the data that exceed a threshold value. This is indicated by block 480. WBS and brush/meter command scaling system 442 then selects the data corresponding to one of the detected accelerations, as indicated by block 482, and scales the current WBS (or the WBS 0.3 seconds ahead of the current WBS) and the brush/meter commands so that they are on the same scale of 0-100%. This is indicated by block 484. Again, the WBS percent can be the current WBS value as a percent of the maximum WBS value in the subset of data. This is indicated by block 486. The WBS percent can also be for the WBS value 0.3 seconds ahead of the current WBS value, as a percent of the maximum WBS value. This is indicated by block 488. The brush and meter command percent can be the current brush and meter command values as a percent of the maximum brush and meter command values in the selected subset of data. This is indicated by block 490. The scaling can be performed in other ways as well, and this is indicated by block 492.

WBS and brush/meter command difference identifier 450 then finds a percent difference between the scaled values (the WBS percent and both the brush command percent and meter command percent values). This is indicated by block 494 in the flow diagram of FIG. 20. The percent difference value for the brush command will be the WBS percent less the brush command percent identified by calculators 444 and 446. This is indicated by block 496 in the flow diagram of FIG. 20. The percent difference value for the meter command is illustratively the WBS percent minus the meter command percent, and this is indicated by block 498. The percent difference can be identified in other ways as well, and this is indicated by block 500.

The percent difference generated by command difference identifier 450 is then applied to the maximum brush and meter commands to obtain the brush and meter adjustment values to proportionately match the WBS. This is indicated by block 502 in the flow diagram of FIG. 20, and discrete brush/meter adjustment calculator 452 calculates this value and outputs it as a discrete adjustment value for this particular acceleration.

WBS and brush/meter command scaling system 442 then determines whether there are more detected accelerations that exceed the acceleration threshold. This is indicated by block 504. If so, processing reverts to block 482 where the next acceleration is selected and processed as discussed above.

Once all of the detected accelerations (that exceed the acceleration threshold), have been processed for this subset of calibration data, then brush/meter adjustment mechanism identifier 454 identifies a relationship between the accelerations and the adjustment values. This is indicated by block 506. For instance, WBS match logic 456 can plot those values and identify a best fit line approximation for those values. The equation representing the line corresponds to the WBS adjustment mechanism (one example of which is identified in Equations 2 and 3 above, for the brush and meter, respectively). WBS boost logic 458 plots these values (where the WBS under consideration was 0.3 ahead of the acceleration) and identifies a best fit line corresponding to the plots. Examples of these mechanisms are illustrated in Equations 4 and 5 above, respectively.

Brush/meter adjustment mechanism identifier 454 then outputs the relationships (Equations 2-5) as adjustment mechanisms that can be applied during operation of the planter to accommodate for accelerations. Outputting the relationships as the adjustment mechanisms is indicated by block 508. These mechanisms provide the adjusted brush and meter commands 510, or boosted brush and meter commands 512 (where the WBS value 0.3 seconds ahead of the acceleration is used). The adjustment mechanisms can be output in other ways as well, and this indicated by block 514.

Figure 21:
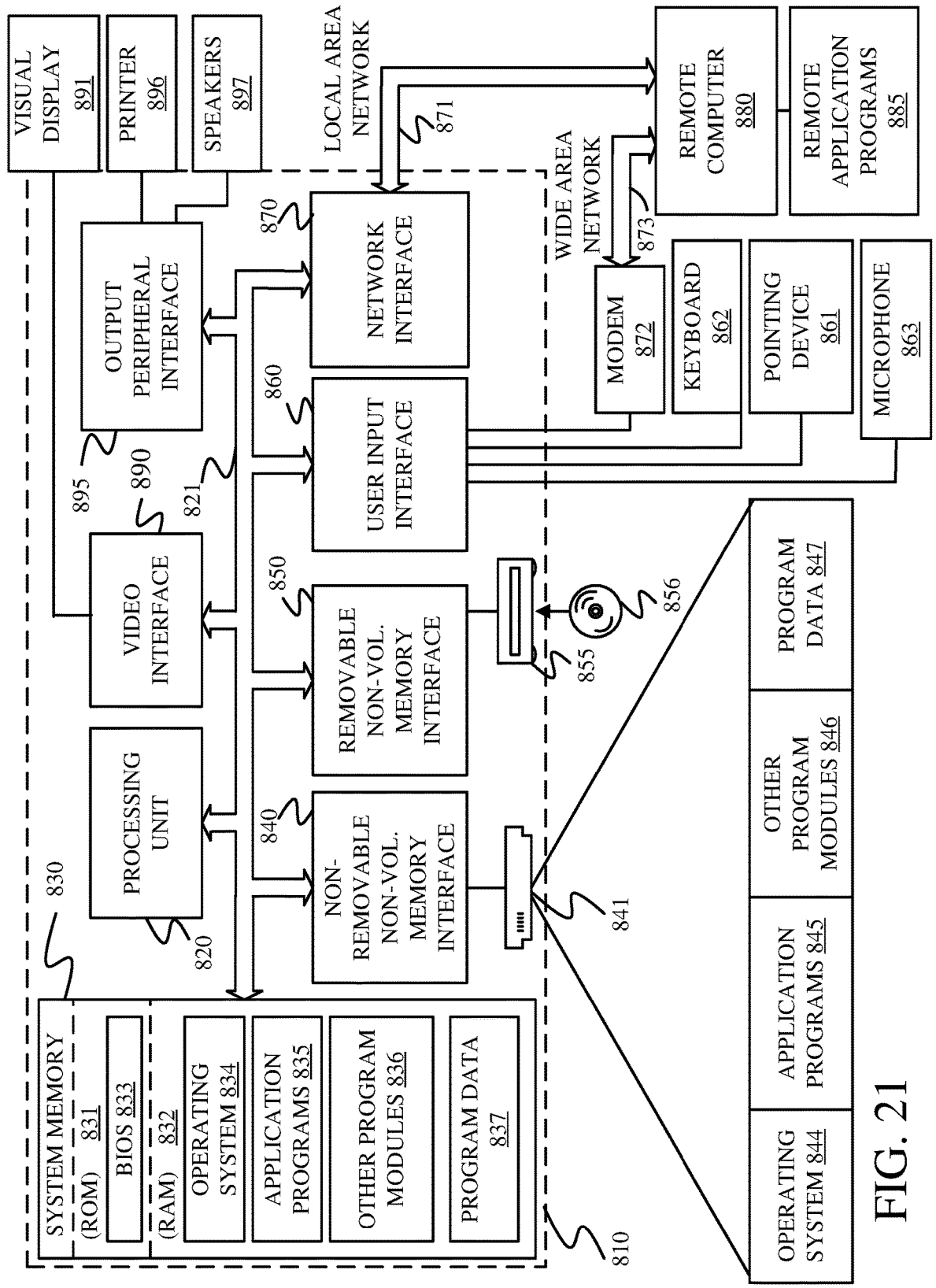
FIG. 21 is a block diagram of one example of a computing environment that can be used in the system shown in previous FIGS.

FIG. 21 is one example of a computing environment in which elements of previous FIGS., or parts of it, (for example) can be deployed. With reference to FIG. 21, an exemplary system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 21.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 21 illustrates operating system 834, application programs 835, other program modules 836, and program data 837.

The computer 810 may also include other removable/non-removable volatile/nonvolatile computer storage media. By way of example only, FIG. 21 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 21, provide storage of computer readable instructions, data structures, program modules and other data for the computer 810. In FIG. 21, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network-CAN, local area network-LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 21 illustrates, for example, that remote application programs 885 can reside on remote computer 880.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

It should also be noted that the different examples described herein can be combined in different ways. That is, parts of one or more examples can be combined with parts of one or more other examples. All of this is contemplated herein.

Example 1 is a computer implemented method of controlling a seeding mechanism on a seeding machine, comprising:
  receiving a wheel based speed signal indicative of a wheel speed of a towing vehicle that is towing the seeding machine;
  detecting that the towing vehicle is moving based on the wheel based speed signal;

detecting that a wheel speed of the seeding machine is below a seeding machine threshold speed at which the seeding mechanism begins a seeding operation; and controlling a seeding motor, that drives the seeding mechanism, to operate so the seeding mechanism performs a seeding operation, based on the wheel speed of the towing vehicle.

Example 2 is the computer implemented method of any or all previous examples wherein controlling the seeding motor comprises:

disabling speed based interlocks that inhibit the seeding mechanism from performing the seeding operation when the seeding machine is traveling at a speed below the seeding machine threshold speed.

Example 3 is the computer implemented method of any or all previous examples and further comprising:

detecting that the seeding machine is traveling at a seeding machine speed that meets the seeding machine threshold speed.

Example 4 is the computer implemented method of any or all previous examples wherein, when the seeding machine is traveling at a seeding machine speed that meets the seeding machine threshold speed, further comprising:

enabling the speed based interlocks; and controlling the seeding motor according to a predefined control algorithm based on the seeding machine speed.

Example 5 is the computer implemented method of any or all previous examples and further comprising:

prior to controlling the seeding motor, detecting that a set of activation criteria are met; and if so, controlling the seeding motor.

Example 6 is the computer implemented method of any or all previous examples wherein detecting that a set of activation criteria are met comprises:

detecting that the towing vehicle is moving at a speed that meets a threshold towing vehicle speed value.

Example 7 is the computer implemented method of any or all previous examples wherein detecting that a set of activation criteria are met comprises:

detecting that the towing vehicle is in a forward gear.

Example 8 is the computer implemented method of any or all previous examples wherein detecting that a set of activation criteria are met comprises:

detecting that the seeding mechanism is in a lowered position to engage ground over which it travels to perform the seeding operation.

Example 9 is the computer implemented method of any or all previous examples and further comprising:

detecting an acceleration value indicative of an acceleration on the seeding machine;

generating a seeding mechanism compensation value that compensates a seeding motor command signal, that controls the seeding motor, based on the wheel based speed value and the acceleration value;

applying the seeding mechanism compensation value to the seeding motor command signal to obtain an adjusted seeding motor command signal; and controlling the seeding motor based on the adjusted seeding motor command signal.

Example 10 is the computer implemented method of any or all previous examples wherein the seeding mechanism comprises a seed meter and the motor comprises a meter motor that drives the seed meter and wherein controlling the seeding motor comprises: controlling the meter motor.

Example 11 is the computer implemented method of any or all previous examples wherein the seeding mechanism comprises a continuous seed delivery mechanism and the motor comprises a delivery mechanism motor that drives the continuous seed delivery mechanism and wherein controlling the seeding motor comprises:

controlling the delivery mechanism motor.

Example 12 is a computer implemented method of controlling a seeding mechanism on a seeding machine, the method comprising:

detecting an acceleration value indicative of an acceleration on the seeding machine;

detecting a wheel based speed value indicative of a wheel speed of a towing vehicle that tows the seeding machine;

generating a seeding mechanism compensation value that compensates a seeding motor command signal, that controls a seeding motor that drives the seeding mechanism, based on the wheel based speed value and the acceleration value;

applying the seeding mechanism compensation value to the seeding motor command signal to obtain an adjusted seeding motor command signal; and controlling the seeding motor based on the adjusted seeding motor command signal.

Example 13 is the computer implemented method of any or all previous examples and further comprising:

prior to generating the seed mechanism compensation value, detecting that the acceleration meets a threshold acceleration value.

Example 14 is the computer implemented method of any or all previous examples wherein the seeding mechanism comprises a seed meter and the motor comprises a meter motor that drives the seed meter and wherein applying the seeding mechanism compensation value comprises:

applying the seed mechanism compensation value to a meter motor command signal to obtain an adjusted meter motor command signal and wherein controlling comprises controlling the meter motor based on the adjusted meter motor command signal.

Example 15 is the computer implemented method of any or all previous examples wherein the seeding mechanism comprises a continuous seed delivery mechanism and the motor comprises a delivery mechanism motor that drives the seed delivery mechanism and wherein applying the seeding mechanism compensation value comprises:

applying the seed mechanism compensation value to a delivery mechanism motor command signal to obtain an adjusted delivery mechanism motor command signal and wherein controlling comprises controlling the delivery mechanism motor based on the adjusted delivery mechanism motor command signal.

Example 16 is the computer implemented method of any or all previous examples wherein the seeding machine comprises a row unit and wherein detecting an acceleration value comprises:

detecting an acceleration value on the row unit.

Example 17 is the computer implemented method of any or all previous examples and further comprising:

detecting that the wheel speed of the seeding machine is below a seeding machine threshold speed at which the seeding mechanism begins a seeding operation; and controlling the seeding motor, that drives the seeding mechanism, to operate so the seeding mechanism performs a seeding operation, based on the wheel speed of the towing vehicle.

Example 18 is a control system for controlling an agricultural seeding machine comprising:
  a wheel based speed (WBS) threshold detector that receives a wheel based speed signal indicative of a wheel speed of a towing vehicle that is towing the seeding machine;
  a seeding machine motion threshold detector that detects whether a wheel speed of the seeding machine is below a seeding machine threshold speed at which the seeding mechanism begins a seeding operation; and
  a slow speed matching controller that control a seeding motor, that drives the seeding mechanism, to operate so the seeding mechanism performs a seeding operation, based on the wheel speed of the towing vehicle, when the seeding machine motion threshold detector detects that the wheel speed of the towing vehicle is below the seeding machine threshold speed at which the seeding mechanism begins a seeding operation.

Example 19 is the control system of any or all previous examples and further comprising:
  an acceleration/deceleration compensation system that compensates a seeding motor speed command signal that controls the speed of the seeding motor based on accelerations imparted on the seeding machine.

Example 20 is the control system of any or all previous examples wherein the acceleration/deceleration compensation system comprises:
  an acceleration threshold detector that receives an acceleration value indicative of an acceleration on the seeding machine;
  a command adjustment system that generates a seeding mechanism compensation value that compensates the seeding motor speed command signal based on the wheel based speed value and the acceleration value and that applies the seeding mechanism compensation value to the seeding motor speed command signal to obtain an adjusted seeding speed motor command signal; and
  a command controller controlling the seeding motor based on the adjusted seeding motor speed command signal.

What is claimed is:

1. A computer implemented method of controlling a seeding mechanism on a seeding machine, the computer implemented method comprising:
  receiving a wheel based speed signal indicative of a wheel speed of a towing vehicle that is towing the seeding machine;
  detecting that the towing vehicle is moving based on the wheel based speed signal;
  detecting that a wheel speed of the seeding machine is below a seeding machine threshold speed at which the seeding mechanism begins a seeding operation;
  in response to the detecting that the towing vehicle is moving and based on the wheel speed of the seeding machine being below the seeding machine threshold speed, generating a seeding mechanism activation trigger; and
  in response to the seeding mechanism activation trigger, controlling a seeding motor, that drives the seeding mechanism, to operate so the seeding mechanism performs a seeding operation, based on the wheel speed of the towing vehicle.

2. The computer implemented method of claim 1 wherein controlling the seeding motor in response to the seeding mechanism activation trigger comprises:
  disabling a speed based interlock that inhibits the seeding mechanism from performing the seeding operation when the seeding machine is traveling at a speed below the seeding machine threshold speed.

3. The computer implemented method of claim 2 and further comprising:
  detecting that the seeding machine is traveling at a seeding machine speed that meets the seeding machine threshold speed.

4. The computer implemented method of claim 3 wherein, when the seeding machine is traveling at a seeding machine speed that meets the seeding machine threshold speed, further comprising:
  enabling the speed based interlock; and
  controlling the seeding motor according to a predefined control algorithm based on the seeding machine speed.

5. The computer implemented method of claim 1 and further comprising:
  prior to controlling the seeding motor, detecting that an activation criterion is met; and
  based on the activation criterion, controlling the seeding motor.

6. The computer implemented method of claim 5 wherein detecting that an activation criterion is met comprises:
  detecting that the towing vehicle is moving at a speed that meets a threshold towing vehicle speed value.

7. The computer implemented method of claim 5 wherein detecting that an activation criterion is met comprises:
  detecting that the towing vehicle is in a forward gear.

8. The computer implemented method of claim 5 wherein detecting that an activation criterion is met comprises:
  detecting that the seeding mechanism is in a lowered position to engage ground over which it travels to perform the seeding operation.

9. The computer implemented method of claim 1 and further comprising:
  detecting an acceleration value indicative of an acceleration on the seeding machine;
  generating a seeding mechanism compensation value that compensates a seeding motor command signal, that controls the seeding motor, based on the wheel based speed signal and the acceleration value;
  applying the seeding mechanism compensation value to the seeding motor command signal to obtain an adjusted seeding motor command signal; and
  controlling the seeding motor based on the adjusted seeding motor command signal.

10. The computer implemented method of claim 1 wherein the seeding mechanism comprises a seed meter and the seeding motor comprises a meter motor that drives the seed meter and wherein controlling the seeding motor comprises:
  controlling the meter motor.

11. The computer implemented method of claim 1 wherein the seeding mechanism comprises a continuous seed delivery mechanism and the seeding motor comprises a delivery mechanism motor that drives the continuous seed delivery mechanism and wherein controlling the seeding motor comprises:
  controlling the delivery mechanism motor.

12. A computer implemented method of controlling a seeding mechanism on a seeding machine, the computer implemented method comprising:
  obtaining a seeding motor command signal that defines a control of a seeding motor that drives the seeding mechanism;
  detecting an acceleration value indicative of an acceleration on the seeding machine;

detecting a wheel based speed value indicative of a wheel speed of a towing vehicle that tows the seeding machine;

determining, based on the acceleration value, that the acceleration on the seeding machine meets a threshold acceleration value;

generating, based on the wheel based speed value and the determination that the acceleration on the seeding machine meets the threshold acceleration value, a seeding mechanism compensation value that represents a compensation of the seeding motor command signal;

applying the seeding mechanism compensation value to the seeding motor command signal to obtain an adjusted seeding motor command signal; and controlling the seeding motor based on the adjusted seeding motor command signal.

13. The computer implemented method of claim 12 wherein the seeding mechanism comprises a seed meter and the seeding motor comprises a meter motor that drives the seed meter and wherein applying the seeding mechanism compensation value comprises:

applying the seed mechanism compensation value to a meter motor command signal to obtain an adjusted meter motor command signal and wherein controlling comprises controlling the meter motor based on the adjusted meter motor command signal.

14. The computer implemented method of claim 12 wherein the seeding mechanism comprises a continuous seed delivery mechanism and the seeding motor comprises a delivery mechanism motor that drives the continuous seed delivery mechanism and wherein applying the seeding mechanism compensation value comprises:

applying the seed mechanism compensation value to a delivery mechanism motor command signal to obtain an adjusted delivery mechanism motor command signal and wherein controlling comprises controlling the delivery mechanism motor based on the adjusted delivery mechanism motor command signal.

15. The computer implemented method of claim 12 wherein the seeding machine comprises a row unit and wherein detecting an acceleration value comprises:

detecting an acceleration value on the row unit.

16. The computer implemented method of claim 12 and further comprising:

detecting that the wheel speed of the seeding machine is below a seeding machine threshold speed at which the seeding mechanism begins a seeding operation; and controlling the seeding motor, that drives the seeding mechanism, to operate so the seeding mechanism performs a seeding operation, based on the wheel speed of the towing vehicle.

17. A control system for controlling an agricultural seeding machine, the control system comprising:

a wheel based speed threshold detector that receives a wheel based speed signal indicative of a wheel speed of a towing vehicle that is towing the agricultural seeding machine;

a seeding machine motion threshold detector configured to generate an indication that a wheel speed of the agricultural seeding machine is below a seeding machine threshold speed at which a seeding mechanism is controlled to begin a first seeding operation; and a slow speed matching controller configured to:

generate a seeding mechanism activation trigger based on the indication that the wheel speed of the agricultural seeding machine is below the seeding machine threshold speed; and in response to the seeding mechanism activation trigger, control a seeding motor, that drives the seeding mechanism, to operate so the seeding mechanism performs a second seeding operation based on the wheel speed of the towing vehicle.

18. The control system of claim 17 and further comprising:

an acceleration/deceleration compensation system that compensates a seeding motor speed command signal that controls a speed of the seeding motor based on accelerations imparted on the agricultural seeding machine, wherein the acceleration/deceleration compensation system comprises:

an acceleration threshold detector that receives an acceleration value indicative of an acceleration on the agricultural seeding machine;

a command adjustment system that generates a seeding mechanism compensation value that compensates the seeding motor speed command signal based on the wheel based speed signal and the acceleration value and that applies the seeding mechanism compensation value to the seeding motor speed command signal to obtain an adjusted seeding speed motor command signal; and a command controller controlling the seeding motor based on the adjusted seeding motor speed command signal.

19. The control system of claim 17, wherein, in the first seeding operation, the seeding motor is controlled to drive the seeding mechanism based on the wheel speed of the agricultural seeding machine.

\* \* \* \* \*